United States Patent
Arsalan et al.

(10) Patent No.: US 11,239,466 B2
(45) Date of Patent: Feb. 1, 2022

(54) NANOCOMPOSITE CATHODE MATERIALS FOR USE IN BATTERIES

(71) Applicant: Saudi Arabian Oil Company, Dhahran (SA)

(72) Inventors: Muhammad Arsalan, Dhahran (SA); Edreese Alsharaeh, Riyadh (SA); Faheem Ahmed, Riyadh (SA); Yazeed Fahad AlDosari, Riyadh (SA)

(73) Assignee: Saudi Arabian Oil Company, Dhahran (SA)

(*) Notice: Subject to any disclaimer, the term of this patent is extended or adjusted under 35 U.S.C. 154(b) by 565 days.

(21) Appl. No.: 15/866,122

(22) Filed: Jan. 9, 2018

(65) Prior Publication Data
US 2019/0214647 A1   Jul. 11, 2019

(51) Int. Cl.
*H01M 10/052*   (2010.01)
*H01M 4/587*   (2010.01)
(Continued)

(52) U.S. Cl.
CPC ............ *H01M 4/587* (2013.01); *B01J 19/126* (2013.01); *C08F 12/08* (2013.01); *C08K 3/042* (2017.05);
(Continued)

(58) Field of Classification Search
None
See application file for complete search history.

(56) References Cited

U.S. PATENT DOCUMENTS

| 8,557,916 B1 | 10/2013 | Alsharaeh et al. |
| 8,790,814 B2 | 7/2014 | Wang et al. |

(Continued)

FOREIGN PATENT DOCUMENTS

| CN | 104 649 700 A | 5/2015 |
| CN | 106 398 179 A | 2/2017 |

(Continued)

OTHER PUBLICATIONS

Song et al. "Advanced Sulfur Cathode Enabled by Highly Crumpled Nitrogen-Doped Graphene Sheets for High-Energy-Density Lithium-Sulfur Batteries", Nano Lett. 2016, 16, 864-870 (Year: 2016).*

(Continued)

*Primary Examiner* — Victoria H Lynch
(74) *Attorney, Agent, or Firm* — Choate, Hall & Stewart LLP; Charles E. Lyon; Michael A. Shinall

(57) ABSTRACT

Presented in the present disclosure are nanocomposites and batteries which are resistant to thermal runaway and may be used as cathode materials in batteries that tolerate operation at high temperatures. The nanocomposites include a nonconducting polymer and a carbon filler which includes a plurality of ultrathin sheets of a porous carbon material. The nonconducting polymer and carbon filler act in synergy to provide improved thermal stability, increased surface area, and enhanced electrochemical properties to the nanocomposite. For example, a battery that includes the nanocomposite as a cathode material was shown to have an enhanced performance and stability over a broad temperature range from room temperature to high temperatures (for example, of 100° C. or more). These batteries fill an important need by providing a safe and reliable power source for devices that are operated at high temperatures such as the downhole equipment used in the oil industry.

13 Claims, 14 Drawing Sheets

(51) Int. Cl.

| | |
|---|---|
| *H01M 10/0525* | (2010.01) |
| *H01M 4/62* | (2006.01) |
| *C08F 12/08* | (2006.01) |
| *C08K 3/04* | (2006.01) |
| *B01J 19/12* | (2006.01) |
| *H01M 4/36* | (2006.01) |
| *H01M 4/58* | (2010.01) |
| *H01M 4/02* | (2006.01) |

(52) U.S. Cl.
CPC ............ *H01M 4/364* (2013.01); *H01M 4/58* (2013.01); *H01M 4/621* (2013.01); *H01M 4/622* (2013.01); *H01M 4/624* (2013.01); *H01M 4/625* (2013.01); *H01M 10/052* (2013.01); *H01M 10/0525* (2013.01); *B01J 2219/0879* (2013.01); *B01J 2219/1206* (2013.01); *C08K 2201/001* (2013.01); *C08K 2201/003* (2013.01); *C08K 2201/006* (2013.01); *C08K 2201/011* (2013.01); *H01M 2004/021* (2013.01); *H01M 2004/028* (2013.01); *H01M 2300/0037* (2013.01)

(56) References Cited

U.S. PATENT DOCUMENTS

| | | | |
|---|---|---|---|
| 9,029,228 B2 | 5/2015 | Seacrist et al. | |
| 9,203,084 B2 | 12/2015 | Wang et al. | |
| 9,362,549 B2 | 6/2016 | Rojeski et al. | |
| 9,368,831 B2 | 6/2016 | He et al. | |
| 9,705,136 B2 | 7/2017 | Rojeski | |
| 9,718,967 B2 | 8/2017 | Malshe | |
| 9,738,057 B2 | 8/2017 | Shin et al. | |
| 9,780,379 B2 | 10/2017 | Zhamu et al. | |
| 9,899,672 B2 | 2/2018 | Zhamu et al. | |
| 10,008,723 B1 | 6/2018 | Zhamu et al. | |
| 10,008,747 B1 | 6/2018 | Zhamu et al. | |
| 10,424,782 B2 | 9/2019 | Arsalan et al. | |
| 2010/0035093 A1 | 2/2010 | Ruoff et al. | |
| 2010/0218801 A1 | 9/2010 | Sung et al. | |
| 2011/0052998 A1* | 3/2011 | Liang | H01M 4/136 429/300 |
| 2011/0086206 A1 | 4/2011 | Scheffer et al. | |
| 2011/0287316 A1* | 11/2011 | Lu | H01G 11/38 429/215 |
| 2012/0142832 A1 | 6/2012 | Varma et al. | |
| 2013/0164635 A1* | 6/2013 | Schmidt | H01M 4/133 429/337 |
| 2013/0180912 A1 | 7/2013 | Li | |
| 2013/0240830 A1 | 9/2013 | Seacrist et al. | |
| 2014/0106223 A1 | 4/2014 | Xu et al. | |
| 2016/0218353 A1 | 7/2016 | Kim et al. | |
| 2016/0344035 A1 | 11/2016 | Zhamu et al. | |
| 2017/0098856 A1 | 4/2017 | Zhamu et al. | |
| 2017/0141387 A1 | 5/2017 | Hayner et al. | |
| 2017/0149051 A1 | 5/2017 | Fujita et al. | |
| 2017/0179475 A1* | 6/2017 | Lu | H01M 4/366 |
| 2017/0294646 A1 | 10/2017 | Zhang et al. | |
| 2018/0248173 A1 | 8/2018 | Pan et al. | |
| 2018/0248194 A1* | 8/2018 | Cheng | H01M 10/0525 |
| 2018/0286599 A1 | 10/2018 | Lin et al. | |
| 2019/0157665 A1* | 5/2019 | Pope | H01M 10/0525 |
| 2019/0214633 A1 | 7/2019 | Arsalan et al. | |
| 2019/0214634 A1 | 7/2019 | Arsalan et al. | |
| 2021/0008628 A1 | 1/2021 | Arsalan et al. | |
| 2021/0013492 A1 | 1/2021 | Arsalan et al. | |

FOREIGN PATENT DOCUMENTS

| | | | | |
|---|---|---|---|---|
| CN | 108 034 256 A | 5/2018 | | |
| CN | 109 182 856 A | 1/2019 | | |
| CN | 109762518 A | 5/2019 | | |
| EP | 2 578 539 A1 | 4/2013 | | |
| WO | WO-2017033213 A1 * | 3/2017 | ............ | H01M 4/587 |
| WO | WO-2019/138271 A1 | 7/2019 | | |
| WO | WO-2019/138272 A1 | 7/2019 | | |
| WO | WO-2021/005535 A1 | 1/2021 | | |
| WO | WO-2021/005538 A1 | 1/2021 | | |

OTHER PUBLICATIONS

Alsharaeh et al., Facile Method for In Situ Preparation of Sty-MMA Copolymer Containing Graphene Sheets using MWI, (Prepr. Pap.-Am. Chem. Soc., Div. Pet. Chem. 2012, 57(1), 142-144) (Year: 2012).*
Aldalbahi, A. et al. Variations in Crystalline Structures and Electrical Properties of Single Crystalline Boron Nitride Nanosheets, Sci. Rep., 5: (16703): 1-9 (2015).
Alsharaeh, E.H. and Othman, A.A., Microwave Irradiation Synthesis and Characterization of RGO-AgNPs/Polystyrene Nanocomposites, Polymer Composites, 1-6 (2014).
Alsharaeh, E.H et al., Evaluation of Nanomechanical Properties of (Styrene?Methyl Methacrylate) Copolymer Composites Containing Graphene Sheets, Ind. Eng. Chem. Res., 52: 17871?17881 (2013).
Alsharaeh, E.H. et al., Microwave Irradiation Effect on the Dispersion and Thermal; Stability of RGO Nanosheets within a Polystyrene Matrix, Materials, 7: 5212-5224 (2014).
Alsharaeh, E.H. et al., Novel synthesis of holey reduced graphene oxide (HRGO) by microwave irradiation method for anode in lithium-ion batteries, 6(29854): 1-13 (2016).
Dean, C.R. et al., Boron nitride substrates for high quality graphene electronics, Nature Nanotechnology, 5: 722-726 (2010). Supplementary Information, 5 pages (2010).
Decker, R. et al., Local Electronic Properties of Graphene on a BN Substrate via Scanning Tunneling Microscopy, Nano Lett., 11: 2291-2295 (2011).
Gyenes, B. et al., Understanding Anomalous Behavior in Coulombic Efficiency Measurements on Li-Ion Batteries, Journal of The Electrochemical Society, 162(3): A278-A283 (2015).
Ishigami, M. et al., Atomic Structure of Graphene on SiO2, Nano Letters, 7(6): 1643-1648 (2007).
Kayyar, A. Construction and Testing of Coin Cells of Lithium Ion Batteries, Journal of Visualized Experiments, 66(e4104): 1-5 (2012).
Liang, Y. et al., Organic Electrode Materials for Rechargeable Lithium Batteries, Adv. Energy Mater., 2: 742-769 (2012).
Lin, D. et al., Reviving the lithium metal anode for high-energy batteries, Nature Nanotechnology, 12: 194-206 (2017).
Nakahara, K. et al., Rechargeable batteries with organic radical cathodes, Chemical Physics Letters, 359: 351-354 (2002).
Nesvadba, P. et al., Synthesis of A Novel Spirobisnitroxide Polymer and its Evaluation in an Organic Radical Battery, Chem. Mater., 22:783-788 783 (2010).
Park, M. et al., A review of conduction phenomena in Li-ion batteries, J. Power Sources, 1-26 (2010).
Suga, T. and Nishide, H., Redox-Active Radical Polymers for a Totally Organic Rechargeable Battery, Chapter 3, Polymers for Energy Storage and Delivery: Polyelectrolytes for Batteries and Fuel Cells, Page, K., et al., American Chemical Society, 9 pages (2012).
Suga, T. et al., p- and n-Type Bipolar Redox-Active Radical Polymer: Toward Totally Organic Polymer-Based Rechargeable Devices with Variable Configuration, Adv. Mater., 23:751-754 (2011).
Sun, X. et al., Developing Polymer Composite Materials: Carbon Nanotubes or Graphene?, Adv. Mater., 25: 5153-5176 (2013).
Xue, J. et al., STM Spectroscopy of ultra-flat graphene on hexagonal boron nitride, Nature Materials, 10: 282-285 (2011).
Xue, Y. et al., Excellent electrical conductivity of the exfoliated and fluorinated hexagonal boron nitride nanosheets, Nanoscale Research Letters, 8(49): 1-7 (2013).
Yan, K. et al., Ultrathin Two-Dimensional Atomic Crystals as Stable Interfacial Layer for Improvement of Lithium Metal Anode, Nano Lett., 1-7 (2014).
Zhu, J. et al., Facile synthesis of metal oxide/reduced graphene oxide hybrids with high lithium storage capacity and stable cyclability, Nanoscale, 3:1084-1089 (2011).

(56) References Cited

OTHER PUBLICATIONS

International Search Report for PCT/IB2018/056449, 5 pages (dated Nov. 23, 2018).
International Search Report for PCT/IB2018/056450, 5 pages (dated Dec. 11, 2018).
Li, H. et al., Reduced Graphene Oxide/Boron Nitride Composite Film as a Novel Binder-Free Anode for Lithium Ion Batteries with Enhanced Performances, Electrochimica Acta, 166: 197-205 (2015).
Rao, C.N.R. et al., Graphene Analogues of Inorganic Layered Materials, Angewandte Chemie International Edition, 52(50): 13162-13185 (2013).
Written Opinion for PCT/IB2018/056449, 10 pages (dated Nov. 23, 2018).
Written Opinion PCT/IB2018/056450, 11 pages (dated Dec. 11, 2018).
Yang, Y. et al., Graphene-based materials with tailored nanostructures for energy conversion and storage, Materials Science and Engineering R, 102: 1-72 (2016).
Byun, S. et al., Ordered, scalable heterostructure comprising boron nitride and graphene for high-performance flexible supercapacitors, Chemistry of Materials, 28:7750-7756 (2016).
Chen, T. et al., Self-Templated Formation of Interlaced Carbon Nanotubes Threaded Hollow Co3S4 Nanoboxes for High-Rate and Heat-Resistant Lithium-Sulfur Batteries, J. Am. Chem. Soc., 139:12710-12715 (2017).
Chiam, S. L. et al., Electrochemical Performance of Supercapacitor with Stacked Copper Foils Coated with Graphene Nanoplatelets. Sci. Rep. 8, 3093 (2018).
Conder, J. et al., Direct observation of lithium polysulfides in lithium-sulfur batteries using operando X-ray diffraction, Nat. Energy, 2: 201769 1-7 (2017).
Deng, D. R. et al., Enhanced Adsorptions to Polysulfides on Graphene-Supported BN Nanosheets with Excellent Li—S Battery Performance in a Wide Temperature Range, ACS Nano, 12(11):11120-11129 (2018).
Fan, Y. et al., Functionalized Boron Nitride Nanosheets/Graphene Interlayer for Fast and Long?Life Lithium-Sulfur Batteries, Advanced Energy Materials, 7:1602380, 6 pages (2017).
Fu, L. et al., Microwave Irradiation-Assisted Exfoliation of Boron Nitride Nanosheets: A Platform for Loading High Density of Nanoparticles, ChemistrySelect, 1:1799-1803 (2016).
Gao, T. et al., Boron nitride/reduced graphene oxide nanocomposites as supercapacitors electrodes, Materials Letters, 159:54-57 (2015).
Golla, D. et al., Ultrafast relaxation of hot phonons in graphene-hBN heterostructures, APL Mater, 5: 056101 1-6 (2017).
International Search Report for PCT/IB2020/056431, 5 pages (dated Sep. 28, 2020).
International Search Report for PCT/IB2020/056436, 5 pages (dated Oct. 1, 2020).
Jing et al., Graphene, inorganic graphene analogs ant their composites for lithium ion batteries, J. Mater. Chem. A., 2:12104-12122 (2014).
Kang, Y, et al., Hybrids of reduced graphene oxide and hexagonal boron nitride: lightweight absorbers with tunable and highly efficient microwave attenuation properties, ACS applied materials & interfaces, 8:32468-32476 (2016).
Kim, I. et al., Microwave-hydrothermal synthesis of boron/nitrogen co-doped graphene as an efficient metal-free electrocatalyst for oxygen reduction reaction, International Journal of Hydrogen Energy, 41:22026-22033 (2016).
Lin, Y. and Connell, J. W. Advances in 2D boron nitride nanostructures: nanosheets, nanoribbons, nanomeshes, and hybrids with graphene, Nanoscale, 4:6908-6939 (2012).
Liu, Y. et al., Synthesis of Composite Nanosheets of Graphene and Boron Nitride and Their Lubrication Application in Oil, Advanced Engineering Materials, 1700488 1-7 (2017).
Monajjem, Majid, Graphene/(h-BN)n/X-doped Graphene as Anode Material in Lithium Ion Batteries (X=Li, Be, B and N), Macedonian Journal of Chemistry and Chemical Engineering, 36(1):101-118 (2017).
Pak, A. J. and Hwang, G. S., Theoretical Analysis of Thermal Transport in Graphene Supported on Hexagonal Boron Nitride: The Importance of Strong Adhesion Due to –Bond Polarization, Phys. Rev., Appl. 6:034015 (2016).
Pan, M. et al., Modification of the electronic properties of hexagonal boron-nitride in BN/graphene vertical heterostructures, 2D Mater., 3:045002 (2016).
Pang, Q. et al., A Comprehensive Approach toward Stable Lithium-Sulfur Batteries with High Volumetric Energy Density, Adv. Energy Mater, 7: 1-9 (2017).
Patil, I. et al., Three dimensional anocomposite of reduced graphene oxide and hexagonal boron nitride as an efficient metal-free catalyst for oxygen electroreduction. Journal of Materials Chemistry A, 4.12 :4506-4515 (2016).
Ren, G. et al., Bio-inspired CO3O4-polylpyrrole-graphene complex as efficient oxygen reduction catalyst by one-step ball-milling, Nano Res., 1-8 (2015).
Saha, S. et al., Band gap engineering of boron nitride by graphene and its application as positive electrode material in asymmetric supercapacitor device, ACS applied materials & interfaces, 7:14211-14222 (2015).
Saha, S. et al., Investigation of band structure and electrochemical properties of h-BN/rGO composites for asymmetric supercapacitor applications, Materials Chemistry and Physics, 190:153-165 (2017).
Saha, S. et al., Modified electrochemical charge storage properties of h-BN/rGO superlattice through the transition from n to p type semiconductor by fluorine doping, Chemical Engineering Journal, 339:334-345 (2018).
Sahoo, R., Pal, A. & Pal, T. 2D materials for renewable energy storage devices: Outlook and challenges. Chem. Commun. 52, 13528-13542 (2016).
Wang, L. et al., Convenient synthesis and applications of gram scale boron nitride nanosheets, Catal. Sci. Technol., 1:1119-1123 (2011).
Wang, Y. et al., Boron nitride nanosheets: large-scale exfoliation in methanesulfonic acid and their composites with polybenzimidazole, J. Mater. Chem, 21:11371-11377 (2011).
Written Opinion for PCT/IB2020/056431, 11 pages (dated Sep. 28, 2020).
Written Opinion for PCT/IB2020/056436, 11 pages (dated Oct. 1, 2020).
Xu, J. et al., Sulfur-Graphene Nanostructured Cathodes via Ball-Milling for High-Performance Lithium-Sulfer Batteries, ACS Nano, 8(10): 10920-10930 (2014).
Yang, S. et al., Mechanical ball-milling preparation of mass sandwich-like cobalt-graphene nanocomposites with high electrochemical hydrogen storage ability, Journal of Materials Chemistry A, 1:6731-6735 (2013).
Zhang, Z. et al., Hexagonal boron nitride: a promising substrate for graphene with high heat dissipation, Nanotechnology, 28:225704 (2017).

\* cited by examiner

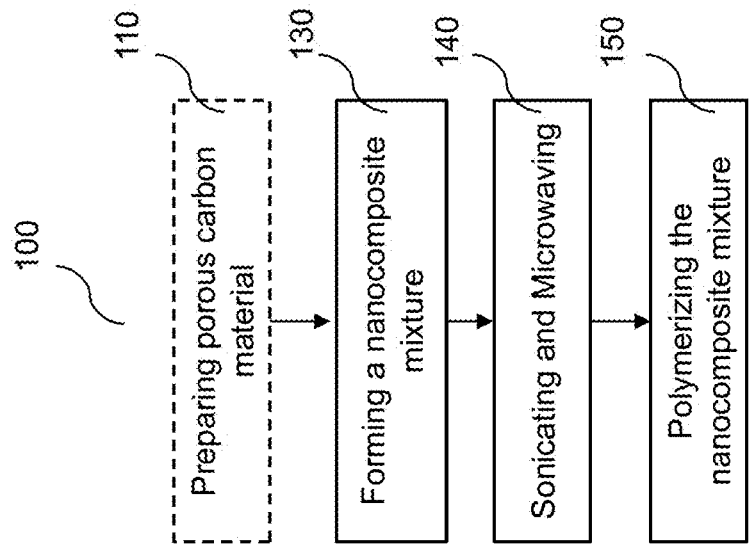

NANOCOMPOSITE CATHODE MATERIALS FOR USE IN BATTERIES

FIELD

The present disclosure relates generally to nanocomposites, and more particularly to cathode materials for batteries (for example, lithium-ion batteries, lithium-sulfur batteries, or both) designed to tolerate operation at high temperatures.

BACKGROUND

Rechargeable batteries are used to power a broad range of consumer devices such as electric vehicles and portable electronic devices. However, these batteries are susceptible to failure and can be unsafe under "abuse conditions" such as when the batteries are overcharged, over-discharged, or operated at a high temperature. For example, when operated at a temperature that is greater than a critical temperature, a rechargeable battery can undergo thermal runaway. During thermal runaway, high temperatures trigger a chain of exothermic reactions in the battery, causing the battery's temperature to increase rapidly. Thermal runaway can cause battery failure, damage to devices, and harm to users. During thermal runaway, rechargeable batteries can be prone to fire and explosion because the electrode materials (for example, anode and cathode materials) can be highly reactive and are unstable. Even when thermal runaway does not occur, cathode materials used in lithium-ion batteries are particularly susceptible to performance decay when operated at high temperatures. For example, cathode materials based on lithium metal oxides can suffer from a loss of capacity. Accordingly, there is a need for improved cathode materials that are resistant to thermal runaway and are safer, more reliable, and more stable when operated at high temperatures.

SUMMARY

Presented in the present disclosure are nanocomposites and batteries which are resistant to thermal runaway and may be used as cathode materials in rechargeable batteries that tolerate operation at high temperatures. The nanocomposites include a nonconducting polymer and a carbon filler which includes a plurality of ultrathin sheets of a porous carbon material. The nonconducting polymer and carbon filler act in synergy to provide improved thermal stability, increased surface area, and enhanced electrochemical properties to the nanocomposite. For example, a battery that includes the nanocomposite as a cathode material was shown to have an enhanced performance and stability over a broad temperature range from room temperature to high temperatures (for example, of 100° C. or more). These batteries fill an important need by providing a safe and reliable power source for devices that are operated at high temperatures such as the downhole equipment used in the oil industry.

The present disclosure encompasses the recognition that the electrochemical activity of a nonconducting polymer can be improved in the presence of a low concentration of ultrathin sheets of a porous carbon material. For example, in certain embodiments, the nanocomposite may contain the ultrathin sheets at a weight percent of only 2% or less. Moreover, the electrochemical activity of the ultrathin sheets of the porous carbon material can be improved (per unit weight of the carbon material) when the sheets are dispersed in the nonconducting polymer, resulting in a high-performance nanocomposite cathode material for rechargeable batteries that can tolerate operation at high temperatures. Without wishing to be bound to any particular theory, it is thought that the ultrathin porous carbon sheets, when uniformly distributed in the nonconducting polymer, provide increased active sites for $Li^+$ insertion, reduced effective diffusion distances for $Li^+$ in the nanocomposite, improved electrical conductivity to the nanocomposite, a decreased charge-transfer resistance during charging and discharging, and improved structural stability against local changes in volume during $Li^+$ insertion and extraction. Moreover, although the nanocomposite includes nonconductive polymer, the conductivity of the composite is unexpectedly high (for example, $10^{-4}$ siemens per centimeter (S/cm) or greater) such that the nanocomposite can be used as a cathode material.

A relatively small quantity of the carbon filler is required in the nanocomposite to achieve the benefits described in the present disclosure. For example, a nanocomposite that includes a carbon filler at a weight percent of 1% is more thermally stable than the carbon filler alone. The carbon filler also improves the thermal stability of the nonconducting polymer. For example, the glass transition temperature of the nanocomposite is greater than that of the nonconducting polymer alone. The electrochemical activity of the nonconducting polymer is improved when the carbon filler is added. For example, when used as a cathode material, the nanocomposite that includes a carbon filler at a weight percent of 1% retains over 40% of the specific capacity (about 180 milliamp-hours per gram (mAh/g)) of the carbon filler alone (about 420 mAh/g). In other words, 40% of the battery's capacity is retained when the amount of carbon filler used is decreased by 100-fold. Therefore, the carbon filler is more effective per unit weight when combined with the nonconducting polymer in the nanocomposite. Since less carbon filler is required, cathode materials can be prepared at a lower cost.

In certain embodiments, the nanocomposites described in the present disclosure may perform better, be more stable, and cost less than conventional cathode materials such as those based on lithium metal oxides. For example, the nanocomposites described in the present disclosure may be stable at high temperatures (for example, greater than 90° C.) and may have consistent electrochemical properties even after 100 or more charge/discharge cycles at high temperature. For example, the nanocomposites described in the present disclosure may not suffer from the characteristic capacity decay of conventional cathode materials based on lithium metal oxides after a few charge/discharge cycles at high temperature. The methods described in the present disclosure are based on microwave irradiation and require fewer chemical additives than many existing methods. Thus, the methods described in the present disclosure may cost less than existing methods for preparing cathode materials. In addition, the cathode materials described in the present disclosure are safer and less toxic than many existing alternatives.

In certain embodiments, the batteries (for example, lithium-ion batteries and lithium-sulfur batteries) described in the present disclosure are safer than conventional batteries when operated at a high temperature. For example, short circuit(s) may not occur at high temperatures in the batteries described in the present disclosure, and the batteries may not undergo thermal runaway at high temperatures. Accordingly, the nanocomposites and batteries described in the present disclosure can be used in safe energy-storage devices and in devices operated at high temperatures. For example, the batteries described in the present disclosure can be used in the oil industry to power downhole equipment such as that used to monitor conditions in oil wells and other oil-related applications where high temperatures are encountered.

In one aspect, the present disclosure is directed to a nanocomposite that includes (a) a nonconducting polymer (for example, an electrically insulating polymer such as polystyrene, poly(methylmethacrylate) (PMMA), or a copolymer of polystyrene and PMMA) and (b) a carbon filler. The carbon filler includes a plurality of ultrathin sheets of a porous carbon material. Each sheet has a thickness from about 1 to about 5 single atoms.

In certain embodiments, the porous carbon material includes porous reduced graphene oxide (for example, holey reduced graphene oxide (HRGO)).

In certain embodiments, each of at least a portion of the ultrathin sheets of the porous carbon material includes a plurality of pores (for example, holes) with an average diameter in the range of 2 nanometers (nm) to 5 nm.

In certain embodiments, the nanocomposite includes the carbon filler at a weight percent in a range from 0.1% to 2%. The weight percent is based on the total weight of the nonconducting polymer and the carbon filler.

In certain embodiments, at least a portion of the plurality of sheets of the porous carbon material has an average sheet thickness in a range from 1 nm to 4 nm. For example, the average sheet thickness may be assessed using scanning electron microscopy.

In certain embodiments, the porous carbon material has a Brunauer-Emmett-Teller (BET) surface area of about 200 square meters per gram ($m^2/g$) or greater.

In certain embodiments, the nonconducting polymer is or includes polystyrene, poly(methylmethacrylate) (PMMA), or a copolymer of polystyrene and PMMA. In certain embodiments, the nonconducting polymer is polystyrene.

In certain embodiments, the nanocomposite has a conductivity of about $10^{-4}$ siemens per centimeter (S/cm) or greater.

In certain embodiments, the porous carbon material is prepared using microwave irradiation, for example, at a power of 900 watts (W) or greater.

In certain embodiments, the nanocomposite has a glass transition temperature of about 90° C. or greater.

In certain embodiments, nanocomposite also includes (i) a binding agent (for example, polyvinylidene fluoride), (ii) a conductive additive (for example, carbon black), or both of (i) and (ii).

In certain embodiments, a summed weight percent of the binding agent and the conductive additive in the nanocomposite is in a range from 5% to 20%. For example, the summed weight percent of the binding agent and the conductive additive in the nanocomposite may be about 10%. The summed weight percent is based on the total weight of (i) the nonconducting polymer, (ii) the carbon filler, and (iii) any binding agent, conductive additive, or both present in the nanocomposite. The amount of the binding agent in the nanocomposite may be zero; or the amount of conductive additive in the nanocomposite may be zero; or the nanocomposite may contain both the binding agent and the conductive additive.

In certain embodiments, the nanocomposite is a film with a thickness in a range from 50 micrometers (μm) to 200 μm. In certain embodiments, the nanocomposite is a film with a thickness in a range from 10 μm to 20 μm.

In certain embodiments, the nanocomposite further includes sulfur (for example, elemental sulfur, a sulfur-containing salt, a sulfur- and lithium-containing salt, a sulfur/graphene composite, or combinations of these).

In certain embodiments, a weight percent of the sulfur is in a range from 40% to 80%. For example, the weight percent of the sulfur may be from 60% to 80% or from 70% to 80%. The weight percent is based on total weight of (i) the nonconducting polymer, (ii) the carbon filler, (iii) any binding agent, conductive additive, or both present in the nanocomposite, and (iv) the sulfur.

In one aspect, the present disclosure is directed to a lithium-ion battery that includes a cathode. The cathode includes the nanocomposite described previously.

In certain embodiments, the lithium-ion battery has a specific capacity (for example, specific charge/discharge capacity) in a range from 100 to 600 milliamp-hours per gram (mAh/g) (for example, a specific charge capacity of 190 mAh/g and a specific discharge capacity of 177 mAh/g) at about 25° C. For example, the specific capacity may be measured at a current density of 100 milliamps per gram (mA/g)). The lithium-ion battery has a specific capacity (for example, specific charge/discharge capacity) in a range from 5 to 20 mAh/g (for example, a specific charge capacity of 13.5 mAh/g and a specific discharge capacity of 14.5 mAh/g) at about 100° C. For example, the specific capacity may be measured at a current density of 100 mA/g.

In certain embodiments, the lithium-ion battery has a reversible capacity in the range of 50 to 200 mAh/g at about 25° C. and a reversible capacity in the range of 5 to 20 mAh/g at about 100° C. For example, the reversible capacity may be measured at a current density of 100 mA/g.

In certain embodiments, the lithium-ion battery retains at least 90% of its specific capacity (for example, specific charge/discharge capacity) after 100 charge/discharge cycles at 25° C. compared to an initial specific charge capacity in a first charge cycle.

In certain embodiments, the lithium-ion battery retains at least 90% of its specific charge capacity (for example, specific charge/discharge capacity) after 100 charge/discharge cycles at about 100° C. compared to an initial specific charge capacity in a first charge cycle.

In certain embodiments, the lithium-ion battery further includes an anode (for example, lithium metal, a lithium-metal oxide, or a carbon material) and an electrolyte [for example, a lithium-containing salt (for example, lithium hexafluorphosphate) in an organic solvent (for example, ethylene carbonate or dimethyl carbonate)].

In one aspect, the present disclosure is directed to a lithium-sulfur battery that includes a cathode. The cathode includes the nanocomposite described previously.

In certain embodiments, lithium-sulfur battery further includes an anode (for example, lithium metal or a lithium-metal oxide) and an electrolyte [for example, a salt (for example, bis(trifluoromethane)sulfonimide lithium salt (LiTFSI)) in an organic solvent (for example, 1,2-Dimethoxyethane (DME) or 1,3-Dioxolane (DOL)).

In one aspect, the present disclosure is directed to a method of preparing a nanocomposite. The method includes contacting together at least a portion of a plurality of ultrathin sheets of a porous carbon material with a nonconducting polymer matrix precursor (for example, styrene or methyl methacrylate) and a polymerization initiator (for example, benzoyl peroxide), thereby forming a nanocomposite mixture. Each of the ultrathin sheets has a thickness from about 1 to about 5 single atoms. The method includes irradiating the nanocomposite mixture with microwaves (for example, at a microwave power of at least 900 W). The method includes heating the nanocomposite mixture (for example, at a temperature of at least 70° C. or at a temperature in a range from 70° C. to 90° C.) to polymerize the polymer matrix precursor, thereby forming a nanocomposite.

In certain embodiments, the plurality of ultrathin sheets of the porous carbon material are prepared using a method that includes reducing graphene oxide in the presence of a template precursor and a reducing agent under microwave irradiation (for example, at a microwave power of at least 900 W for at least 2 minutes) to obtain a plurality of templated reduced graphene oxide (RGO) sheets. For example, the template precursor may be $AgNO_3$ dissolved in water at a weight percent of at least 10% where the weight percent is based on the weight of the $AgNO_3$ and the water (at least 1 part, by weight, of $AgNO_3$ for every 9 parts water). Furthermore, for example, the reducing agent may be hydrazine hydrate, and may be added at a weight percent of at least 2.5% (based on total weight of template precursor, water, and reducing agent), for example, at a weight percent in a range from 2.5% to 7.5%. Each templated RGO sheet includes a plurality of templates (for example, Ag nanoparticles) that cover a plurality of templated areas on the basal plane of the RGO sheet. The method includes removing at least a portion of the plurality of templates from the RGO sheets. For example, the templates may be removed by dissolving the templates and underlying templated areas in nitric acid under microwave irradiation to form the plurality of ultrathin sheets of the porous carbon material (for example, the plurality of holey reduced graphene oxide (HRGO) sheets). For example, microwave irradiation may be applied at a microwave power of at least 900 W. For example, microwave irradiation may be applied at a microwave power in range from 900 W to 1800 W. Positions of the plurality of pores may correspond to positions of the plurality of templated areas on the basal plane of each templated RGO sheet.

In certain embodiments, after the nanocomposite mixture is formed, it is contacted together with sulfur. For example, the nanocomposite mixture may be contacted together with elemental sulfur, a sulfur-containing salt, a sulfur- and lithium-containing salt, a sulfur/graphene composite, or combinations of these. A weight percent of the sulfur in the nanocomposite may be in a range from 50% to 80%. For example, the weight percent of the sulfur may be in a range from 60% to 80% or from 70% to 80%. The weight percent is based on total weight of the nanocomposite (including sulfur).

BRIEF DESCRIPTION OF THE DRAWING

The foregoing and other objects, aspects, features, and advantages of the present disclosure will become more apparent and better understood by referring to the following description taken in conjunction with the accompanying drawings, in which:

FIG. 1A is a block diagram showing a method for preparing a nanocomposite, according to an illustrative embodiment;

Figure 1B:
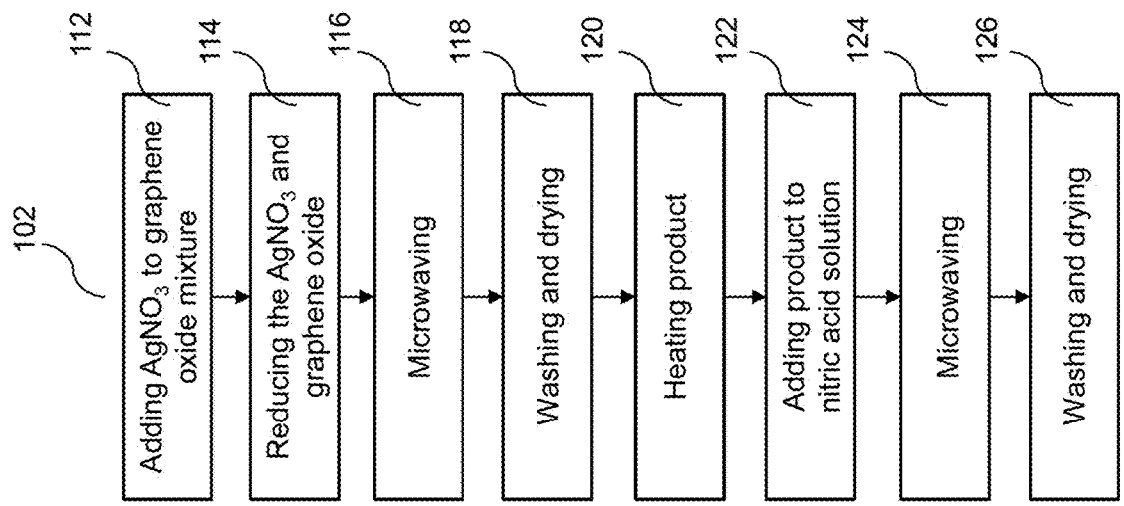
FIG. 1B is a block diagram showing a method for preparing HRGO, according to an illustrative embodiment.

The features and advantages of the present disclosure will become more apparent from the detailed description set forth in the following when taken in conjunction with the drawings, in which like reference characters identify corresponding elements throughout. In the drawings, like reference numbers generally indicate identical elements, functionally similar elements, or structurally similar elements.

Definitions

About, Approximately: As used in the present disclosure, the terms "about" and "approximately," in reference to a number, are used to include numbers that fall within a range of 20%, 10%, 5%, 1%, or 0.5% in either direction of (greater than or less than) the number unless otherwise stated or otherwise evident from the context (except where such number would exceed 100% of a possible value).

Anode: As used in the present disclosure, the term "anode" refers to the negative electrode of a battery. Oxidation reactions occurs at the anode.

Cathode: As used in the present disclosure, the term "cathode" refers to the positive electrode of a battery. Reduction reactions occur at the cathode.

Capacity, specific capacity, specific charge capacity: As used in the present disclosure, the term "capacity" means the product of the discharge current (for example, in amps (A) or milliamps (mA)) and the discharge time (for example, in hours (h)) for a battery at a given load. For example, a "capacity" may be expressed in amp-hours (Ah) or milliamp-hours (mAh). As used in the present disclosure, the term "specific capacity" means the product of the discharge current and the discharge time of a battery at a given load for a given weight of electrode material (for example, for a given weight of nanocomposite used as an anode material in a battery). For example, a "specific capacity" may be expressed in amp-hours per gram (Ah/g) or milliamp-hours per gram (mAh/g). In certain embodiments, "specific capacity" is referred to as "specific discharge capacity." As used in the present disclosure, the term "specific charge capacity" means the product of the charge current and the charge time for a battery at a given load for a given weight of electrode material (for example, for a given weight of nanocomposite used as an anode material). For example, a "specific charge capacity" may be expressed in Ah/g or mAh/g.

Charge/discharge cycle, Cycle: As used in the present disclosure, the terms "charge/discharge cycle" and "cycle" refer to the process of charging, discharging, or both a battery. For example, a single charge/discharge cycle includes charging and discharging a battery. In certain embodiments, a battery may be discharged either fully or partially during a discharge cycle. For example, 100%, 90%, 80%, 70%, or less of a battery's capacity may be discharged during a discharge cycle. Similarly, in certain embodiments, a battery may be charged either fully or partially during a charge cycle. For example, a battery may be charged to 100%, 90%, 80%, 70%, or less of its full capacity during a charge cycle.

Charge/discharge rate: As used in the present disclosure, the term "charge/discharge rate" refers to a measure of the rate at which a battery is charged and discharged. For example, "charge/discharge rate" can be expressed as a current or current density. For example "charge/discharge rate" can be expressed relative to the maximum charge capacity of the battery as a so-called C-rate.

Downhole equipment: As used in the present disclosure, the term "downhole equipment" refers to devices used to measure the conditions inside an oil well. For example, downhole equipment may include a pressure sensor for measuring the pressure inside an oil well or a temperature sensor for measuring the temperature inside an oil well. As used in the present disclosure, the term "oil well" means a boring (for example, a drilled hole or tunnel) in the earth that is designed to bring hydrocarbons (for example, oil) from an underground hydrocarbon reservoir to the surface.

Graphene oxide: As used in the present disclosure, the term "graphene oxide" refers to a material substantially composed of ultrathin sheets of a compound of carbon, oxygen, and hydrogen, where each sheet has a thickness defined by a monolayer of carbon rings (for example, a layer of carbon rings approximately one atom thick, with attached oxygen-containing moieties on the edges of the carbon rings, above the plane of carbon rings, below the plane of carbon rings, or combinations of these). In certain embodiments, the carbon, oxygen, and hydrogen may be present in variable ratios. Graphene oxide may be obtained, for example, by treating graphite with strong oxidizers. In certain embodiments, the graphene oxide may include a dopant; in certain embodiments there is no dopant. Examples of dopants include boron and nitrogen.

High Pressure: As used in the present disclosure, the term "high pressure" refers to a pressure of greater than atmospheric pressure (1 atmosphere). For example, an oil well is typically under conditions of high pressure during oil recovery because of the high temperature of the well, hydrostatic pressure from the column of water extending from the well bore to the oil-bearing formation, pressure induced by pumping fluid in and out of the reservoir, and internal sources of pressure such as from the gases and fluids in the reservoir. Examples of high pressure are, for example, at least 1 atmosphere, at least 10 pounds per square inch gauge (psig), at least 50 psig, at least 100 psig, at least 200 psig, at least 500 psig, at least 1000 psig, at least 2000 psig, at least 3000 psig, or at least 5000 psig.

High Temperature: As used in the present disclosure, the term "high temperature" refers to a temperature from about 80° C. to about 100° C. For example, an oil reservoir, during drilling or oil recovery, may have a temperature of 80° C. to 100° C. or greater.

Improve, Increase, Reduce, Decrease: As used in the present disclosure, the terms "improve", "increase", "reduce, "decrease", or their grammatical equivalents, indicate values that are relative to a baseline or other reference measurement. In certain embodiments, an appropriate reference measurement may be or comprise a measurement under particular reference conditions (for example, at a temperature near an average ambient temperature) absent the presence of (for example, prior to) a particular change in these conditions (for example, an increase in temperature).

Nonconducting polymer: As used in the present disclosure, the term "nonconducting polymer" refers to a polymer material that does not conduct electricity. For example, a "nonconducting polymer" may act as an electrical insulator. For example, the conductivity of a nonconducting polymer may be on the order of about $10^{-14}$ S/m or less. In contrast, "conducting polymers" such as polyacetylene, polypyrrole, and polyaniline are electrically conductive and can act as electrical conductors.

Porous: As used in the present disclosure, the term "porous" means containing a plurality of pores or holes. For example, the ultrathin sheets of the porous carbon material described in the present disclosure include a plurality of pores which, in some embodiments, have an average pore diameter in a range from 2 nm to 5 nm.

Stable: As used in the present disclosure, the term "stable" refers to not substantially changing in physical properties or not substantially deteriorating in performance over a usable lifetime. For example, a stable nanocomposite does not undergo substantial physical changes during a predetermined useable lifetime of the product in which the nanocomposite is used. For example, a stable electrode for a rechargeable battery substantially retains its charge capacity after repeated use.

Substantially: As used in the present disclosure, the term "substantially" refers to the qualitative condition of exhibiting total or near-total extent or degree of a characteristic or property, where "near-total" means within 20%, 10%, 5%, 1%, or 0.5% of the total (in either direction).

Two-dimensional (2D) material: As used in the present disclosure, the term "2D material" refers to a material substantially composed of ultrathin sheets having a thickness defined by a monolayer approximately one atom thick.

For example, graphene, reduced graphene oxide, and hexagonal boron nitride are two-dimensional materials. In certain embodiments, the 2D material may include a dopant; in certain embodiments there is no dopant. Examples of dopants include carbon, boron, and nitrogen, Thermal Stability: As used in the present disclosure, the term "thermal stability" refers to a measure of the extent to which a material is stable at high temperature. For example, an electrode material with a superior thermal stability will remain stable at high temperature, while an electrode material with an inferior thermal stability will likely undergo changes (for example, chemical or structural transformations) leading to decreased performance.

Ultrathin: As used in the present disclosure, the term "ultrathin" refers to having a thickness defined by a monolayer within one or two orders of magnitude of the thickness of a single atom. For example, an ultrathin sheet may have an average sheet thickness no greater than 20 nm, for example, in a range from 5 nm to 20 nm. In other embodiments, an ultrathin sheet may have an average thickness equal to the diameter of no greater than 10 atoms, no greater than 5 atoms, no greater than 3 atoms, no greater than 2 atoms, or about 1 atom. For example, an ultrathin sheet may have a thickness from about 0.3 nm to 1.5 nm.

DETAILED DESCRIPTION

It is contemplated that systems, architectures, devices, methods, and processes described in the present disclosure encompass variations and adaptations developed using information from the embodiments described in the present disclosure. Adaptation, modification, or both of the systems, architectures, devices, methods, and processes described in the present disclosure may be performed, as contemplated by this description.

Throughout the description, where articles, devices, systems, and architectures are described as having, including, or comprising specific components, or where processes and methods are described as having, including, or comprising specific steps, it is contemplated that, additionally, there are articles, devices, systems, and architectures of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the disclosure remains operable. Moreover, two or more steps or actions may be conducted simultaneously.

The mention in the present disclosure of any publication, for example, in the Background section, is not an admission that the publication serves as prior art with respect to any of the claims presented in the present disclosure. The Background section is presented for purposes of clarity and is not meant as a description of prior art with respect to any claim.

Headers are provided for the convenience of the reader—the presence, placement, or both of a header is not intended to limit the scope of the subject matter described in the present disclosure.

In certain embodiments, the present disclosure encompasses the recognition of synergistic effects achieved through the combination of a plurality of ultrathin sheets of a porous carbon material with a nonconducting polymer. For example, a nanocomposite that includes both a nonconducting polymer and a carbon filler that includes ultrathin sheets of a porous carbon material may provide improved thermal and electrochemical properties when used as a cathode material. For example, a nanocomposite in which the weight percent of the carbon filler is in a range from 0.1% to 2% (or a battery containing the nanocomposite) may exhibit an enhanced conductivity, an increased thermal stability, an increased specific charge/discharge capacity, and a more stable cycling performance at both room temperature (for example, about 25° C.) and at high temperatures (for example, at about 100° C. or greater) than the component materials of the nanocomposite alone.

The batteries (for example, lithium-ion batteries or lithium-sulfur batteries) described in the present disclosure can be used, in certain embodiments, to power downhole equipment which is used to measure conditions inside oil wells or during other oil-related operations, for example, during oil discovery and recovery. Downhole equipment can include pressure and temperature sensors for measuring the pressure and temperature, respectively, in an oil well during drilling and oil recovery. Conditions in an oil well can be variable with temperatures in a range from 80° C. to 100° C. or greater. The ability to monitor these conditions allows drilling and oil recovery to be performed more effectively and for potential safety concerns (for example, caused by sudden increases in temperature, pressure, or both) to be identified early such that the risks of damage to equipment and human injury are greatly reduced. For example, the batteries described in the present disclosure may have improved safety, electrochemical properties, and stability compared to those of conventional batteries used to power downhole equipment. For example, the lithium-ion batteries and lithium-sulfur batteries described in the present disclosure provide lightweight power sources with an improved energy density, cycle life, and structural stability than batteries employing conventional cathode materials.

In certain embodiment, the batteries described in the present disclosure obviate (or decrease) the need for complex engineering techniques and safety devices that may otherwise be used in an attempt to limit the likelihood of thermal runaway. For example, while safety devices may relieve high pressure in a battery to help prevent thermal runaway, such devices are not 100% effective or completely reliable. Instead, the batteries described in the present disclosure provide a more cost-effective and safer option for preventing thermal runaway without relying on complex safety devices.

Nanocomposites

Preparing Porous Carbon Material

FIG. 1A shows an illustrative example of a method 100 for preparing a nanocomposite. Method 100 begins, optionally, with preparing a plurality of ultrathin sheets of a porous carbon material in Step 110. The ultrathin sheets of a porous carbon material prepared in Step 110 may be one atom thick or may have a thickness from about two to five single atoms. The porous carbon material may be porous reduced graphene oxide such as holey reduced graphene oxide (HRGO).

FIG. 1B shows an illustrative example of a method 102 for preparing HRGO. In Step 112 of FIG. 1B, silver nitrate ($AgNO_3$) is added as a template precursor to an aqueous mixture that includes graphene oxide. The aqueous graphene oxide mixture contains graphene oxide at a concentration of at least 2 milligrams per milliliter (mg/mL). For example, the aqueous graphene oxide mixture may contain graphene oxide at a concentration in a range from 2 mg/mL to 10 mg/mL. In certain embodiments, the concentration of graphene oxide in the aqueous graphene oxide mixture is 80% to 95% by weight, based on the total weight of the mixture. A solution of $AgNO_3$ is added at a volumetric ratio of at least 1:250 (volume $AgNO_3$ solution:volume graphene oxide mixture). The concentration of the AgNO$_3$ solution is at least 5% (for example, 5% to 20%) by weight based on the weight of AgNO$_3$ and the weight of the solvent used (for example, water).

In Step 114, the graphene oxide is reduced in the presence of the AgNO$_3$ template precursor using a reducing agent. For example, the reducing agent may be a solution that includes hydrazine hydrate. In Step 114, this reducing agent solution is added at a volumetric ratio of at least 0.012:50 (volume of reducing agent solution:volume of the graphene oxide and AgNO$_3$ mixture).

Figure 5B:
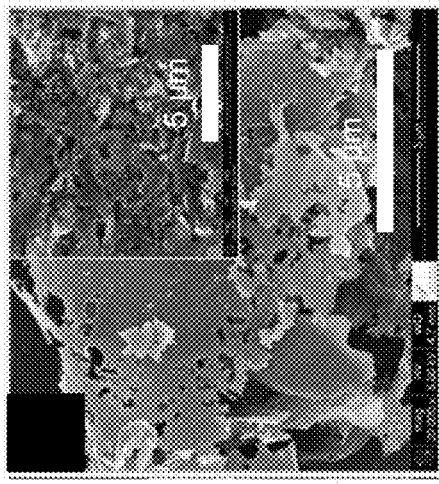
FIG. 5B is a scanning electron micrograph of an example HRGO sample, according to an illustrative embodiment.
Figure 5D:
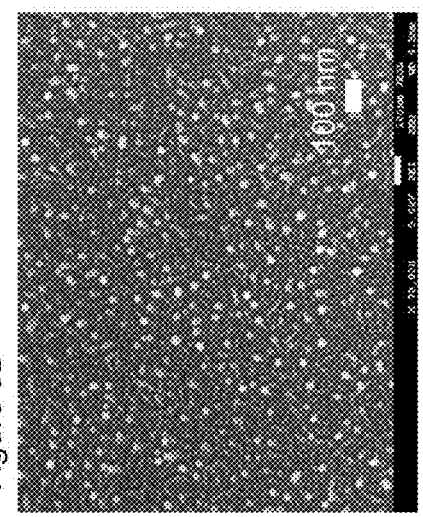
FIG. 5D is a scanning electron micrograph of polystyrene (PS), according to an illustrative embodiment.
Figure 5A:
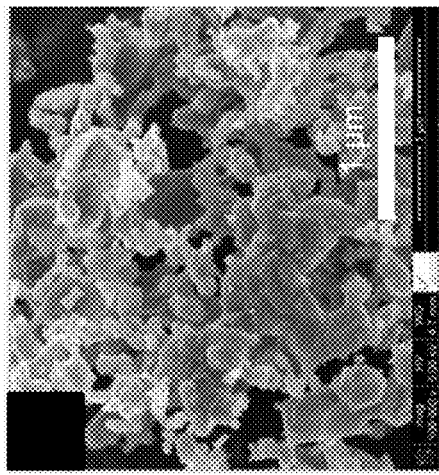
FIG. 5A is a scanning electron micrograph of an example AgNPs/RGO sample, according to an illustrative embodiment.

In Step 116, the sample is exposed to microwaves to obtain a plurality of templated reduced graphene oxide (RGO) sheets. The microwave power is at least 900 W, and the sample is exposed to microwaves for at least 2 minutes. For example, the microwave power may be in a range from 900 W to 1800 W. Each templated RGO sheet includes a plurality of Ag nanoparticle templates that cover a number of templated areas on the basal plane of the RGO sheet. A scanning electron micrograph of an example templated RGO sample is shown in FIG. 5A.

In Step 118, the mixture from Step 116 is washed. Solids in the mixture are separated from the liquids based on density (for example, by centrifugation and removal of the supernatant). The solids are then redispersed in a washing fluid to remove residual materials from the templated RGO sheets. This process may be repeated multiple times. The washing fluid may include distilled water, another solvent (for example, an organic solvent), one or more salts, an acid (for example, dilute hydrochloric acid), or combinations of these. After the templated RGO sheets are washed, they are separated from the washing fluid and dried to obtain a powder of the templated RGO sheets. The material is then dried at room temperature or at a temperature of 30° C., 40° C., 50° C., or 60° C. The product is then dried for 1 hour, 2 hours, 6 hours, 12 hours, 24 hours, or a similar interval of time.

In Step 120, the templated RGO sheets are heated (for example, in a furnace) to a temperature of at least 250° C. (for example, 250° C. to 350° C.) for at least 2 h to improve the catalytic activity of the Ag templates for the subsequent formation of pores in the graphene oxide sheets.

In Step 122 and Step 124, at least a portion of the Ag nanoparticle templates are removed from the templated RGO sheets by dissolving the templates in a nitric acid solution under microwave irradiation, thereby removing the underlying templated areas. The nitric acid solution includes nitric acid at a concentration of at least 1 mole per liter (mol/L) (for example, 1 mol/L to 3 mol/L). For example, the nitric acid solution can include nitric acid at a concentration of 2.6 mol/L. The templated RGO sheets are added to the nitric acid solution at a concentration of at least 2 mg/mL. The microwave power used for microwave irradiation is at least 900 W. For example, the microwave power may be in a range from 900 W to 1800 W. The sample is exposed to microwaves for at least 2 minutes. Following the removal of the Ag nanoparticle templates, a plurality of holey reduced graphene oxide (HRGO) sheets are obtained. Each HRGO sheet includes a plurality of pores (for example, holes) such that the positions of the pores correspond to the positions of Ag nanoparticle templates prior to their removal. A scanning electron micrograph of an example HRGO sample is shown in FIG. 5B.

In Step 126, the product of Step 122 and Step 124 is washed. For example, solids are separated from the liquids based on density (for example, by centrifugation and removal of the supernatant). The solids are then redispersed in a washing fluid to remove residual materials from the HRGO sheets. This process may be repeated multiple times. The washing fluid may include distilled water, another solvent (for example, an organic solvent), one or more salts, an acid (for example, dilute hydrochloric acid), or combinations of these. After the HRGO sheets are washed, they are separated from the washing fluid and dried to obtain a powder of the HRGO sheets. The product is dried at room temperature or at a temperature of 30° C., 40° C., 50° C., or 60° C. The product is then dried for 1 hour, 2 hours, 6 hours, 12 hours, 24 hours, or a similar interval of time.

Combining Porous Carbon Material with Polymer Matrix Precursor

Returning to FIG. 1A, a nanocomposite mixture is formed in Step 130 of method 100. In Step 130, a plurality of ultrathin sheets of a porous carbon material (obtained in Step 110 or otherwise) are contacted together (for example, combined with or mixed with) a nonconducting polymer matrix precursor (for example, styrene, methyl methacrylate, or both) and a polymerization initiator (for example, benzoyl peroxide). The initiator is added at a weight ratio of polymerization initiator:nonconducting polymer precursor in a range from 1:5 to 1:20. The carbon filler is added at a weight percent in a range from 0.1% to 2%, where the weight percent is based on total weight of the nonconducting polymer and the carbon filler. For example, the carbon filler may be added at a weight percent of about 1%.

Sonicating and Microwaving

In Step 140, the nanocomposite mixture from Step 130 is sonicated and irradiated with microwaves to form a nanocomposite. Sonication is performed for at least 30 minutes at a frequency in a range from 25 kilohertz (kHz) to 45 kHz and a power of at least 60 W (for example, 60 W to 120 W). Microwave irradiation is performed at a power of at least 900 W for at least 2 minutes. For example, the microwave power is in a range from 900 W to 1800 W. Sonication and microwave irradiation may be followed by a washing and drying step as described previously.

Polymerizing the Polymer Matrix Precursor

In Step 150 of method 100, the nanocomposite mixture is heated at a temperature of at least 70° C. to polymerize the polymer matrix precursor. For example, the nanocomposite mixture may be heated at a temperature in a range from 70° C. to 90° C. A nanocomposite is formed following the completion of Step 150. For example, styrene may be polymerized to form polystyrene. For example, methyl methacrylate may be polymerized to form poly(methyl methacrylate) (PMMA). For example, a mixture of polystyrene and PMMA, or a hybrid monomer of polystyrene-PMMA, may be polymerized to form a copolymer of polystyrene and PMMA. Polymerization may be followed by a washing and drying step as described previously.

Figure 2:
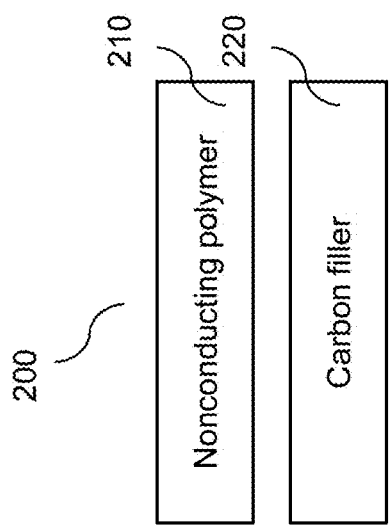
FIG. 2 is a block diagram showing a nanocomposite, according to an illustrative embodiment.

FIG. 2 is a block diagram showing a nanocomposite 200, according to an illustrative embodiment. For example, nanocomposite 200 includes nonconducting polymer 210 and carbon filler 220. Nonconducting polymer 210 may be polystyrene, poly(methylmethacrylate) (PMMA), a blend of polystyrene and PMMA, or a copolymer of polystyrene and PMMA.

Figure 5C:
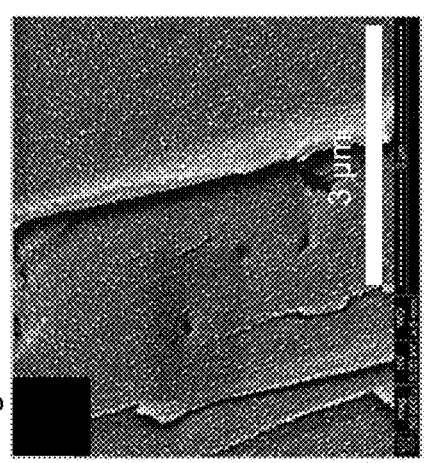
FIG. 5C is a scanning electron micrograph of an example 1% HRGO/PS nanocomposite, according to an illustrative embodiment.

The weight percent of carbon filler 220 in nanocomposite 200 is in a range from 0.1% to 2% where the weight percent is based on the total weight of the nonconducting polymer and the carbon filler. Carbon filler 220 includes a plurality of ultrathin sheets of a porous carbon material. For example, the porous carbon material may include porous reduced graphene oxide or holey reduced graphene oxide. At least a portion of the ultrathin sheets of the porous carbon material in carbon filler 220 includes a plurality of pores (for example, holes) with an average diameter in a range from 2 nm to 5 nm. At least a portion of the plurality of sheets of the porous carbon material in carbon filler 220 has an average sheet thickness in a range from 1 nm to 4 nm. The Brunauer-Emmett-Teller (BET) surface area of the porous carbon material in carbon filler 220 is about 200 m²/g or greater. A scanning electron micrograph of an example nanocomposite sample is shown in FIG. 5C.

Figure 8:
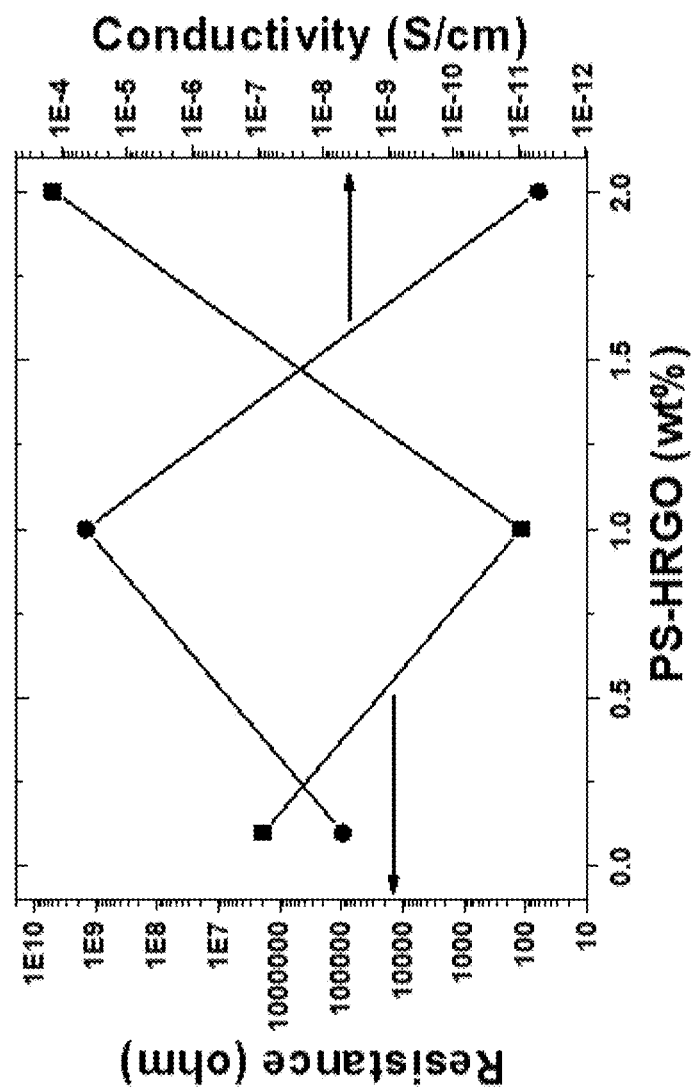
FIG. 8 is a plot of conductivity versus weight percent of HRGO in example HRGO/PS nanocomposites, according to an illustrative embodiment.
Figure 9:
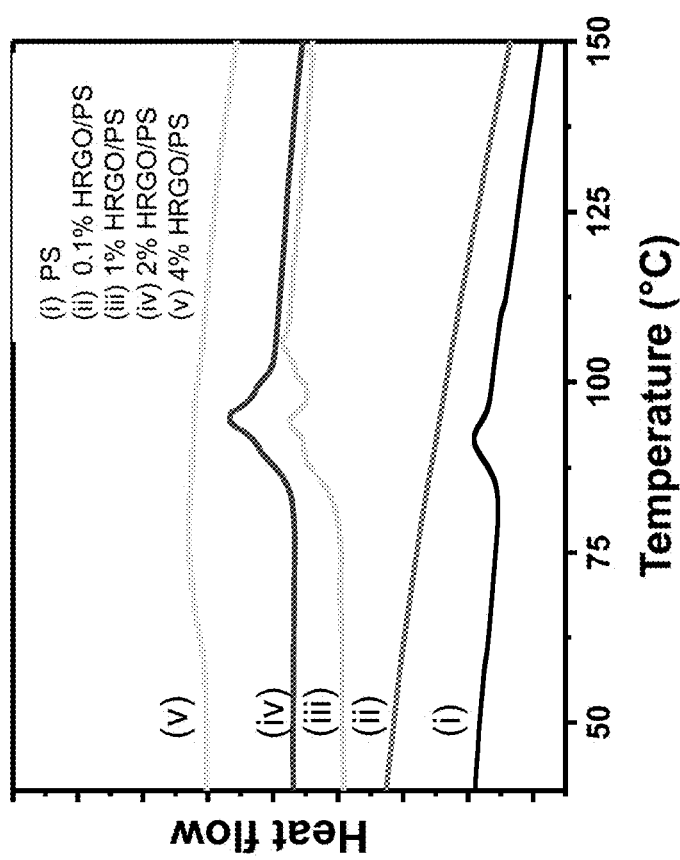
FIG. 9 is differential scanning calorimetry (DSC) curves (heat flow versus temperature) for polystyrene and example HRGO/polystyrene nanocomposites containing different amounts of HRGO, according to an illustrative embodiment.

Nanocomposite 200 has a conductivity of about $10^{-4}$ S/cm or greater and a glass transition temperature ($T_g$) of about 90° C. or greater. The conductivity of an example nanocomposite is shown in FIG. 8, and differential scanning calorimetry (DSC) curves of example nanocomposite samples, which may be used to calculate $T_g$, are shown in FIG. 9. Without wishing to be bound to any particular theory, it is thought that the carbon filler, when combined with the nonconducting polymer, provides an increased electrical conductivity to the nanocomposite while simultaneously improving its thermal stability (for example, by increasing the glass transition temperature of the nonconducting polymer). Glass transition temperatures measured for different example nanocomposite samples and nonconducting polymers are shown in Table 1.

Lithium-Ion Batteries and Lithium-Sulfur Batteries

Figure 3:
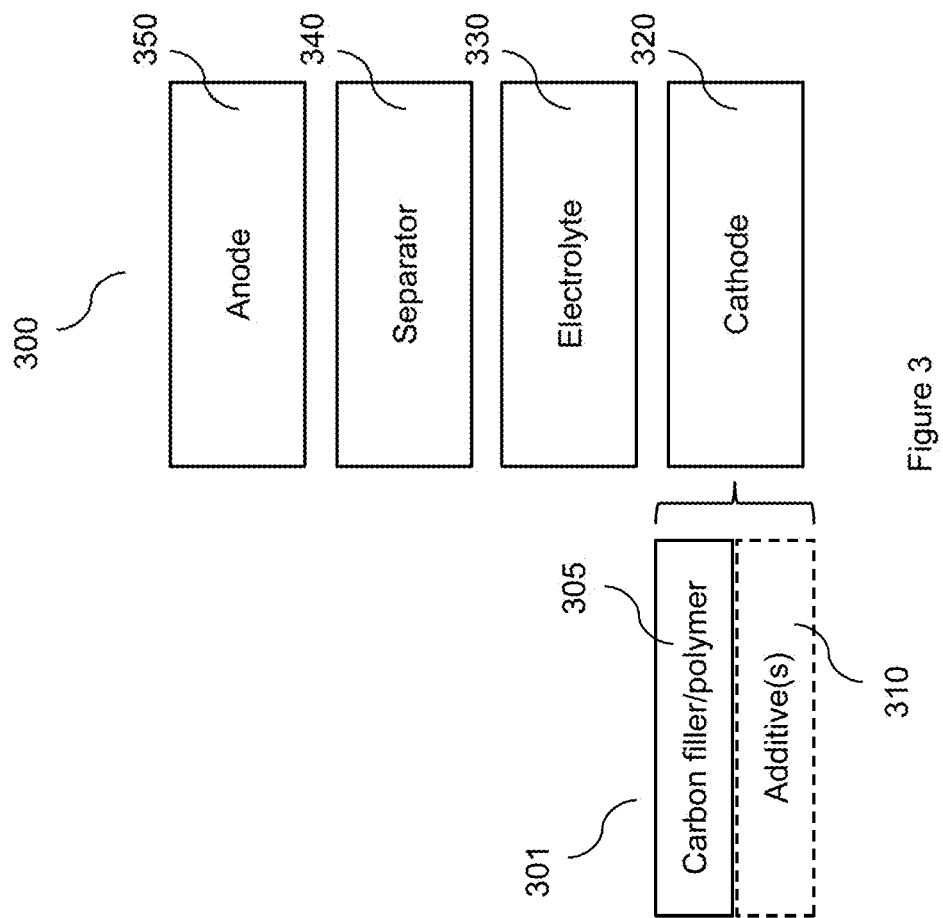
FIG. 3 is a block diagram showing a battery, according to an illustrative embodiment.

The nanocomposites described previously may be used as cathode materials in batteries (for example, lithium-ion and lithium-sulfur batteries) that are designed to tolerate operation at high temperatures. FIG. 3 shows an illustrative example of a battery 300 designed for this purpose. Battery 300 includes a cathode 320, an electrolyte 330, a separator 340, and an anode 350. The cathode includes a cathode material 301, which includes a carbon filler/nonconducting polymer nanocomposite 305 (for example, the nanocomposite obtained in Step 150 of method 100 shown in FIG. 1A) and other additive(s) 310. Additive(s) 310 may be prepared in a solvent and may include a binding agent, a conductive additive, sulfur, or combinations of the same. The binding agent may, for example, be polyvinylidene fluoride, polyethylene oxide (PEO) or poly(tetrafluoroethylene) (PTFE). The conductive additive may, for example, be carbon black or a carbon nanotube (CNT)-based additive. The solvent may, for example, be N-methyl-2-pyrrolidone or tetrahydrofuran.

A summed weight percent of the binding agent and the conductive additive in the nanocomposite may be in a range from 5% to 20% where the weight percent is based on the total weight of (i) the nonconducting polymer, (ii) the plurality of ultrathin sheets of the porous carbon material, and (iii) any binding agent, conductive additive, or both present in the nanocomposite. For example, the amount of the binding agent in the nanocomposite may be zero, or the amount of conductive additive in the nanocomposite may be zero. Alternatively, the nanocomposite may contain both the binding agent and the conductive additive. In certain embodiments, the summed weight percent of the binding agent and the conductive additive in the nanocomposite is about 10%.

In certain embodiments, the nanocomposite is a film with a thickness in a range from 50 micrometers (μm) to 200 μm, while, in other embodiments, the nanocomposite is a film with a thickness in a range from 10 μm to 20 μm. A film of the nanocomposite may be prepared on a current collector such as a copper foil. For example, a homogeneous slurry of the nanocomposite may be prepared in a solvent, spread on the copper foil, and allowed to dry.

In certain embodiments, battery 300 is a lithium-ion battery. For a lithium-ion battery, cathode 350 may be, for example, a lithium metal or a lithium metal oxide. For a lithium-ion battery, electrolyte 330 may be, for example, one or more lithium salts dissolved in one or more organic solvents. For example, the one or more lithium salts may include lithium hexafluorphosphate. The organic solvents may include, for example, ethylene carbonate or dimethyl carbonate. Separator 340 is a polypropylene membrane that is placed between anode 350 and cathode 320.

The lithium-ion battery may exhibit an improved electrochemical performance at both room temperature (for example, at about 25° C.) and at high temperatures (for example, of 100° C. or greater). For example, the lithium-ion battery may have a specific capacity (for example, specific charge/discharge capacity) in range from 100 mAh/g to 600 mAh/g or greater at about 25° C. For example, the lithium-ion battery may have a have a specific capacity (for example, specific charge/discharge capacity) in range from 5 mAh/g to 20 mAh/g or greater at about 100° C. For example, the lithium-ion battery may have a reversible capacity in the range of 50 mAh/g to 200 mAh/g at about 25° C. For example, the lithium-ion battery may have a reversible capacity in the range of 5 mAh/g to 20 mAh/g at about 100° C.

A lithium-ion battery that includes the nanocomposite described in the present disclosure may remain stable and retain its useful electrochemical properties after multiple charge/discharge cycles at both room temperature (for example, at about 25° C.) and at a high temperature (for example, of 100° C. or greater). For example, after 100 charge/discharge cycles at about 25° C. or 100° C., the lithium-ion battery may retain at least 90% of its specific capacity compared to an initial specific capacity measured in the first charge cycle at the same temperature. For example, after 100 charge/discharge cycles at about 100° C., the coulombic efficiency of the lithium-ion battery may be 90% or greater.

In certain embodiments, battery 300 is a lithium-sulfur battery. To prepare a cathode material for lithium-sulfur batteries, the nanocomposite may further include sulfur, for example, as one of additive(s) 310. Nanocomposite 301 may include sulfur in the form of elemental sulfur, a sulfur-containing salt, a sulfur- and lithium-containing salt, a sulfur/graphene composite, or combinations of these. For a nanocomposite that includes sulfur, the weight percent of sulfur in the nanocomposite is in a range from 40% to 80% where the weight percent is based on total weight of (i) the nonconducting polymer, (ii) the plurality of ultrathin sheets of the porous carbon material, and (iii) any binding agent, conductive additive, or both present in the nanocomposite, and (iv) the added sulfur. For example, a weight percent of sulfur in the nanocomposite may be in a range from 60% to 80%. For example, a weight percent of sulfur in the nanocomposite may be in a range from 70% to 80%.

For a lithium-sulfur battery, cathode 350 may be, for example, a lithium metal or a lithium metal oxide. For a lithium-sulfur battery, electrolyte 330 may be, for example, one or more lithium salts dissolved in one or more organic solvents. For example, the lithium salts may include bis (trifluoromethane)sulfonimide lithium salt (LiTFSI). For example, the organic solvents may include 1,2-dimethoxyethane (DME) or 1,3-dioxolane (DOL). Separator 340 is a polypropylene membrane that is placed between anode 350 and cathode 320.

EXPERIMENTAL EXAMPLES

Example 1: X-Ray Diffraction of Nanocomposites

Figure 4:
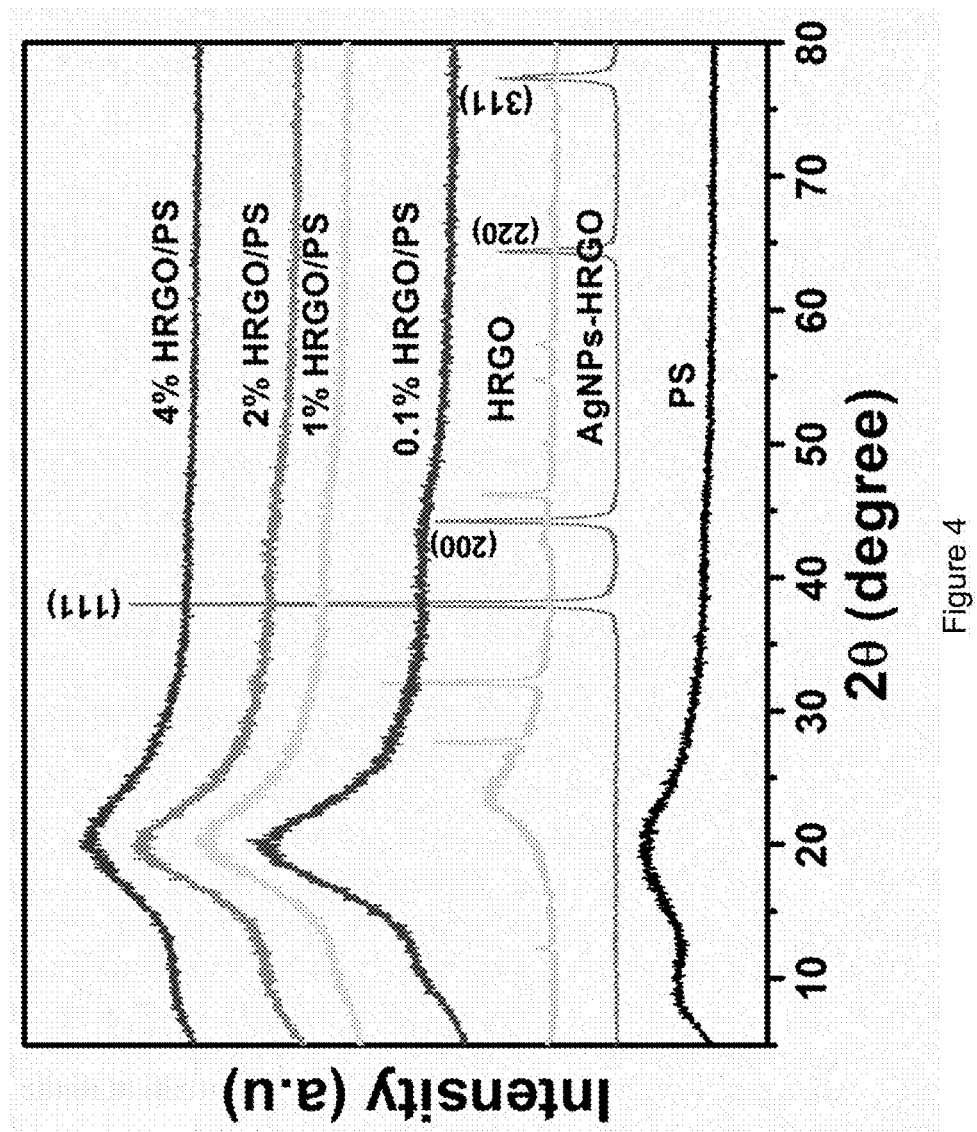
FIG. 4 is a plot of X-Ray diffraction (XRD) patterns for example samples, according to an illustrative embodiment.

X-ray diffraction (XRD) studies were performed on samples with a Philips-PW 1729 X-ray diffractometer (Holland) using Cu Kα radiation (1.54430 angstrom (A)) at 30 kilovolts (kV) and 40 milliamps (mA). FIG. 4 shows the XRD patterns of unmodified polystyrene (PS), reduced graphene oxide sheets with silver nanoparticle templates (AgNPs/RGO), HRGO, a nanocomposite containing 0.1 weight percent (wt. %) HRGO in polystyrene (0.1% HRGO/PS), a nanocomposite containing 1 wt. % HRGO in polystyrene (1% HRGO/PS), a nanocomposite containing 2 wt. % HRGO in polystyrene (2% HRGO/PS), and a nanocomposite containing 4 wt. % HRGO in polystyrene (4% HRGO/PS).

As shown in FIG. 4, the intensity of the XRD peak at about 2θ=20°, which corresponds to the polystyrene matrix, decreased as the weight percent of HRGO in polystyrene increased. This decrease in the intensity of the peak at about 2θ=20° indicated that the HRGO sheets were evenly dispersed in the polystyrene matrix. Because the HRGO sheets were evenly dispersed in the polystyrene matrix, the nanocomposite was more likely to retain the desirable electrical, electrochemical, thermal, and mechanical properties of HRGO (for example, the enhanced electron mobility, electrical conductivity, and thermal conductivity of HRGO).

Example 2: Microstructure of Nanocomposites

The nanocomposites and their component materials were observed using scanning electron microscopy (SEM, FEI QUANTA™ 200, USA). Samples were mounted on specimen mounts and coated with gold via a sputtering system (POLARON™ E6100, Bio-Rad, USA).

FIG. 5A shows a scanning electron micrograph of reduced graphene oxide sheets with Ag nanoparticle templates on their surfaces (AgNPs/RGO). The absence of charging in the SEM micrograph indicated that both the network of RGO sheets and the individual sheets themselves were electrically conductive.

FIG. 5B shows a scanning electron micrograph of a holey reduced graphene oxide (HRGO) sample after the removal of the Ag nanoparticle templates. The inset to FIG. 5B shows a high magnification micrograph of the same HRGO sample. According to the micrographs shown in FIG. 5B, the HRGO sample had a porous structure. Moreover, as with the AgNPs/RGO sample described previously, the absence of charging in the SEM micrograph indicated that both the network of RGO sheets and the individual sheets were electrically conductive.

FIG. 5C shows a scanning electron micrograph of the 1% HRGO/PS nanocomposite sample. Bright spots in the image corresponded to polystyrene (PS)-covered regions of the nanocomposite. The vertical cracks in the image correspond to stacks of multiple (for example, 2 or more) HRGO sheets. For comparison, the microstructure of unmodified PS is shown in FIG. 5D. PS alone (FIG. 5D) had a chainlike structure, while the 1% HRGO/PS nanocomposite (FIG. 5C) included a PS coating over the ultrathin HRGO sheets.

High-resolution transmission electron microscopy (HR-TEM) was performed at 200 kV using a JEOL JSM-2100F transmission electron microscope (USA). To prepare samples for transmission electron microscopy, each sample to be imaged was dispersed in ethanol. A drop of each mixture was then placed on a copper grid and allowed to dry before being imaged.

Figure 6A:
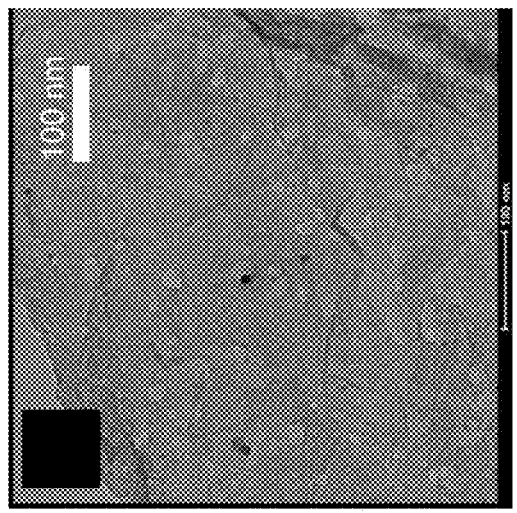
FIG. 6A is a transmission electron micrograph of an example HRGO sample, according to an illustrative embodiment.

FIG. 6A shows a transmission electron micrograph of an HRGO sample obtained after microwave irradiation of a AgNPs/RGO sample and refluxing of the sample in a nitric acid solution. As shown in FIG. 6A, the HRGO sheets contain pores along their basal plane. Residual Ag nanoparticle templates were not observed in the transmission electron micrographs, indicating that the Ag nanoparticles were completely removed during microwave irradiation and refluxing in nitric acid. These observations were in agreement with the absence of peaks in the XRD patterns of HRGO associated with the presence of Ag (see FIG. 4). Overall, the combination of the results shown in FIG. 6A and FIG. 4 confirm that the Ag nanoparticle templates were completely removed by microwave irradiation and refluxing in nitric acid solution.

For most of the pores shown in FIG. 6A, each pore is associated with a single Ag nanoparticle template. However, during template removal, some of the Ag nanoparticles created tracks along the surface of the HRGO sheets. These tracks might have been caused by the motion of the Ag nanoparticle templates along the RGO surface during template removal under microwave irradiation and refluxing in nitric acid. Larger Ag nanoparticle templates typically yielded pores with larger diameters (or tracks with larger widths). Some pores (or tracks) may have originated from the removal of a plurality of Ag nanoparticle templates that were close together on the RGO sheets. For example, adjacent templates might have merged to form branched tracks or larger single pores such as those shown in FIG. 6A. Overall, these results confirm that the Ag nanoparticle templates catalyzed the oxidation and subsequent removal of carbon atoms in contact with the templates, resulting in the formation of pores (and tracks). Meanwhile, carbon atoms in the RGO sheets that were sufficiently distant from the Ag nanoparticle templates were not oxidized, and pores did not form in these regions.

Figure 6C:
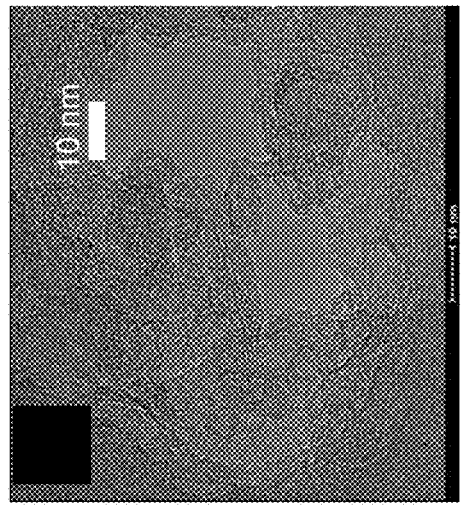
FIG. 6C is a transmission electron micrograph of an example 1% HRGO/PS nanocomposite at increased magnification, according to an illustrative embodiment.
Figure 6B:
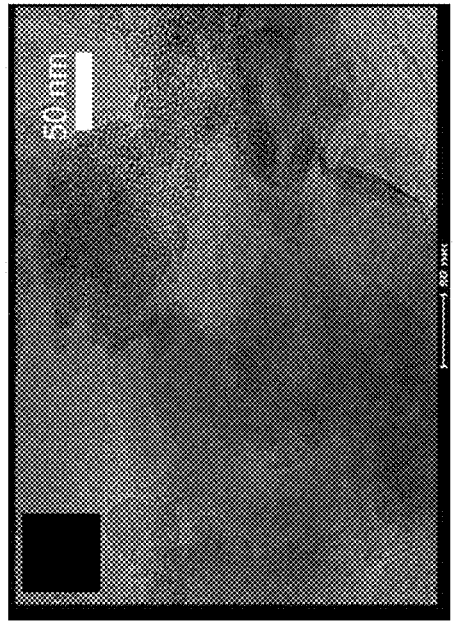
FIG. 6B is a transmission electron micrograph of an example an example 1% HRGO/PS nanocomposite at lower magnification, according to an illustrative embodiment.

FIG. 6B and FIG. 6C show transmission electron micrographs of a 1% HRGO/PS nanocomposite sample at low and high magnifications, respectively. Notably, the HRGO sheets were evenly dispersed and embedded within the polystyrene matrix in this sample. As shown in FIG. 6B and FIG. 6C, the HRGO sheets, prepared by microwave irradiation and refluxing in nitric acid, had a large specific surface area, which was likely increased via the adhesion of the HRGO sheets to the polystyrene matrix. This adhesion (and subsequent increase in surface area) may have been facilitated by interactions between the phenyl groups in the polystyrene matrix and the HRGO sheets via π-π stacking.

The transmission electron micrographs shown in FIG. 6B and FIG. 6C also revealed that most of the pores in the HRGO sheets extended through the entire thickness of the HRGO sheets. The HRGO sheets stacked such that electrolyte could more easily access each HRGO sheet in each stack, providing improved ion transport and improved performance as a cathode material for both lithium-ion batteries and lithium-sulfur batteries. Accordingly, because of the stacked structure of the HRGO sheets, electrolyte was able to access more of the cathode material not only via the pores and tracks in each HRGO sheet but also through the large continuous channels that formed between the expanded HRGO sheets (for example, the stacks of HRGO sheets). These features likely played an important role in facilitating lithium-ion transport and intercalation in the nanocomposite, particularly at increased charge/discharge rates (for example, at current density of 100 mA/g or greater).

Example 3: BET Surface Area and BJH Pore Size of HRGO

Figures 7A, 7B:
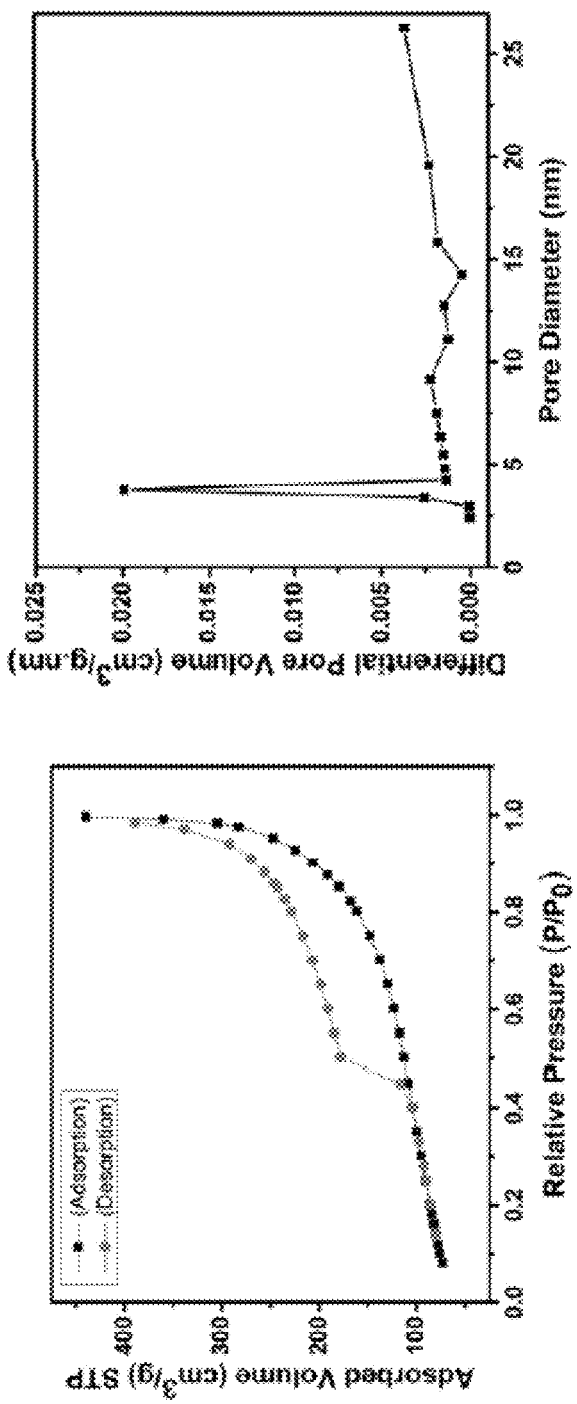
FIG. 7A is a plot of the nitrogen adsorption-desorption isotherm for an example HRGO sample, according to an illustrative embodiment.
FIG. 7B is a plot of Barrett-Joyner-Halenda (BJH) pore size distribution of an example HRGO sample, according to an illustrative embodiment.

FIG. 7A shows a nitrogen adsorption-desorption isotherm for an example HRGO sample. This isotherm was used to calculate the Brunauer-Emmett-Teller (BET) surface area of the HRGO sample. The HRGO sheets exhibited a large BET surface area of 457 m$^2$/g, which was larger than that of natural graphite (8.5 m$^2$/g), pristine graphene (275 m$^2$/g), and unmodified HRGO foam (131 m$^2$/g).

FIG. 7B shows a plot of pore size distribution for a HRGO sample. The pore size distribution is plotted as differential pore volume versus pore diameter and was calculated using Barrett-Joyner-Halenda (BJH) theory. The BJH calculations confirmed that the HRGO sheets had a porous structure and revealed an average pore size in the range from 2 nm to 5 nm.

Example 4: Electrical Properties of Nanocomposites

In order to be useful as a cathode material in lithium-ion batteries and lithium-sulfur batteries, a nanocomposite must have a minimum electrical conductivity that is on par with that of other cathode materials. Other commonly used cathode materials such as $LiCoO_2$, $LiMn_2O_4$, and $LiFePO_4$ have an electrical conductivity in a range from about $10^{-4}$ to $10^{-9}$ S/cm. An increased conductivity is desirable for a cathode material. Accordingly, the conductivities (and resistances) of example samples of the nanocomposite were measured to confirm their usefulness as a cathode material. FIG. 8 shows the electrical conductivities (and resistances) of example nanocomposite samples containing different amounts of HRGO from 0.1 wt. % to 2 wt. %. The conductivity of the nanocomposites initially increased (and the resistance decreased) with an increase in the HRGO content of the nanocomposite from 0.1 wt. % to 1 wt. %. The conductivity of the nanocomposite then decreased (and resistance increased) when the HRGO content was increased further to 2 wt. %. A maximum conductivity of about $10^{-4}$ S/cm was observed for the nanocomposite with 1 wt. %. This conductivity is appropriate for a material that is used as a cathode material.

Example 5: Thermal Stability of Nanocomposites

Differential scanning calorimetry (DSC) was performed with a HITACHI, DSC 7020. FIG. 9 shows DSC curves (that is, plots of heat flow versus temperature) for polystyrene and HRGO/polystyrene nanocomposites containing different amounts of HRGO from 0.1 wt. % to 4 wt. %. Materials exhibiting peaks in their DSC curves that were shifted to increased temperatures corresponded to materials with a greater thermal stability. An optimum thermal stability was observed for the HRGO/polystyrene nanocomposite containing 1 wt. % HRGO (1% HRGO/PS), indicating that this example nanocomposite had desirable thermal properties for use in batteries (for example, lithium-ion batteries or lithium-sulfur batteries) designed to tolerate operation at high temperatures.

The glass transition temperature ($T_g$) of each of the materials were calculated from the data shown in FIG. 9. $T_g$ values for different nanocomposite formulations are shown in Table 1. The value of $T_g$ determines the effective thermal operating limits (that is, the range of appropriate operating temperatures) for a nanocomposite cathode. In general, a nanocomposite cathode will remain functional at temperatures up to about $T_g$.

TABLE 1 summary of thermal, electrical, and electrochemical properties of nanocomposites.

| Properties | HRGO | HRGO/PS wt. %[#] | HRGO/PS $T_g$ (° C.) | HRGO/ PMMA $T_g$ (° C.) | HRGO/PS-PMMA $T_g$ (° C.) |
|---|---|---|---|---|---|
| Glass transition temperature ($T_g$) | | 0 | 91.6 | 115 | 93.6 |
| | | 0.1 | 93.0 | 129 | 91.6 |
| | | 1 | 94.2 | 131 | 90.8 |
| | | 2 | 95.0 | 135 | 90.5 |
| | | wt. %[#] | σ (S/cm) | σ (S/cm) | |
| Electrical conductivity (σ) | | 0.1 | $5.0 \times 10^{-9}$ | $6.3 \times 10^{-4}$ | |
| | | 1 | $4.23 \times 10^{-5}$ | $6.9 \times 10^{-3}$ | |
| | | 2 | $5.0 \times 10^{-12}$ | $1.0 \times 10^{-3}$ | |
| Specific Capacity* (mAh/g) | 423 | | 181 | | |

*Specific capacity was evaluated after 100 cycles at 100 mA/g
[#]wt. % of HRGO

Example 6: Electrochemical Properties of Nanocomposites

In this experimental example, a cathode was fabricated by mixing 90 wt. % of the 1% HRGO/PS sample with 5 wt. % of the conductive agent carbon black, and 5 wt. % of the binding agent polyvinylidene fluoride in N-methyl-2-pyrrolidone solvent at 10 mg/mL. A homogenous slurry of this mixture was prepared and spread as a film on a copper foil substrate, which acted as a current collector. This film was then allowed to dry at 60° C. under vacuum.

The cathode was used in a two-electrode coin half-cell with a polypropylene membrane separator (Celgard 2325, Celgard, Inc., USA) and a lithium metal (purity 99.9%) anode. The electrolyte was 1.2 mol/L lithium hexafluorophosphate ($LiPF_6$) in a 1:1 by volume mixture of ethylene carbonate (EC):dimethyl carbonate (DMC). The cells were assembled in a dry room and galvanostatically charged/discharged at a current density of 100 mA/g in a potential range from 0.005 volt (V) to 3 V, using a multi-channel battery tester (TOYO TOSCAT-3100U, USA).

Figure 10:
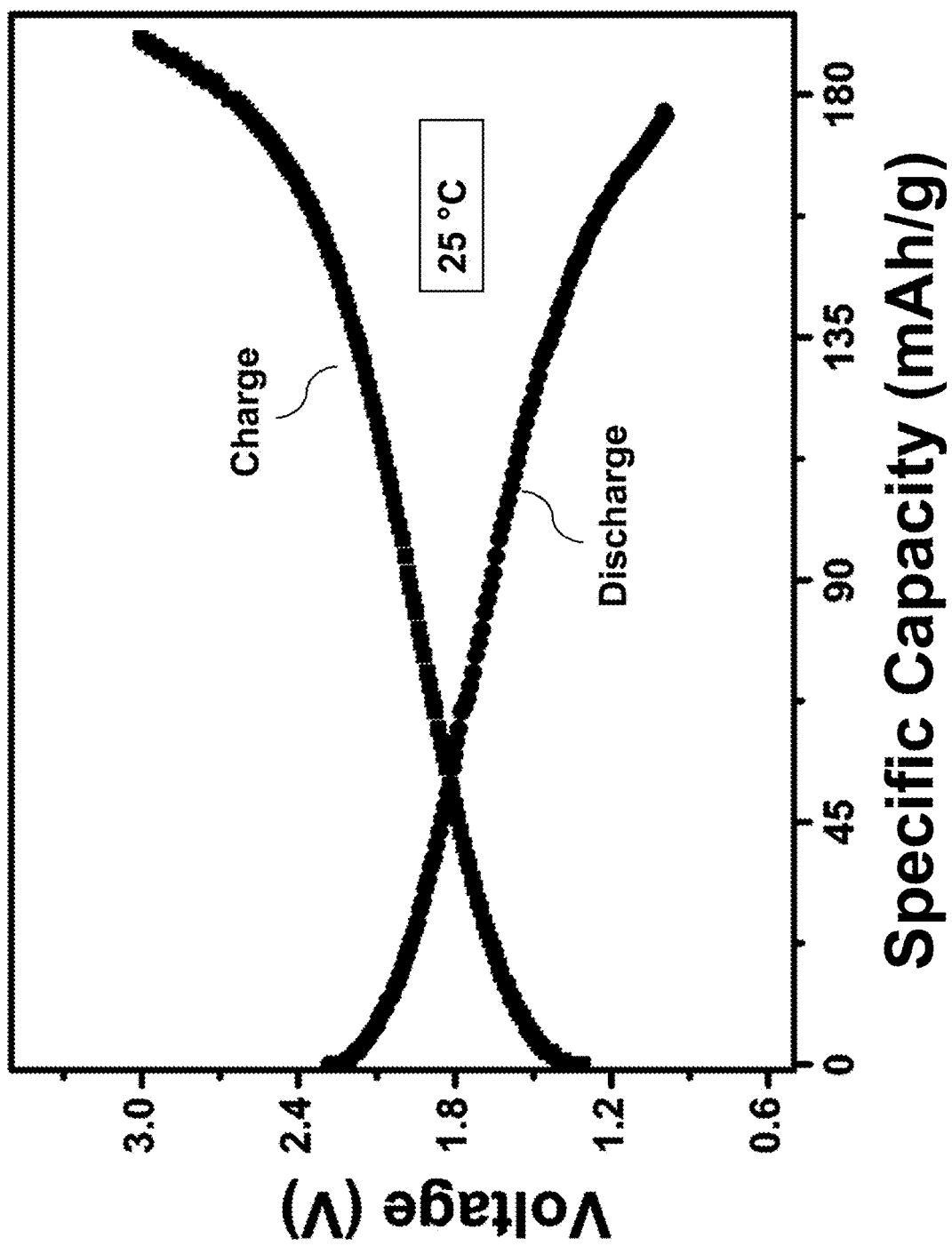
FIG. 10 is a plot of voltage versus specific capacity at room temperature (about 25° C.) for a lithium-ion battery prepared with an example 1% HRGO/PS nanocomposite, according to an illustrative embodiment.

FIG. 10 shows initial galvanostatic charge/discharge curves for the coin cell battery at a current density of 100 mA/g at 25° C. In this experimental example, a typical charge/discharge cycle was defined as (i) a charge cycle (during which $Li^+$ insertion occurs until a lower limit voltage of 0.005 V was reached) and (ii) a discharge cycle (during which $Li^+$ extraction occurs until a cut-off voltage of 3 V was reached). The voltage profiles for charging and discharging shown in FIG. 10 indicated that $Li^+$ was successfully intercalated into the cathode structure. During the charge cycle, a voltage plateau was observed at about 0.9 V. This plateau was maintained until the voltage decreased steadily to 0.005 V (results shown here for voltage window from 0.5 V to 3 V).

Based on the results shown in FIG. 10, the coin cell battery had a specific charge capacity of 190 mAh/g and a specific discharge capacity of 177 mAh/g during this charge/discharge cycle. The irreversible capacity loss (that is, the difference between the charge and discharge capacities) observed during the cycle was primarily attributed to the formation of a solid electrolyte interphase (SEI) layer on the surface of the cathode material, the reaction of lithium ions with residual functional groups in the cathode material that contain oxygen, or both.

Figure 11:
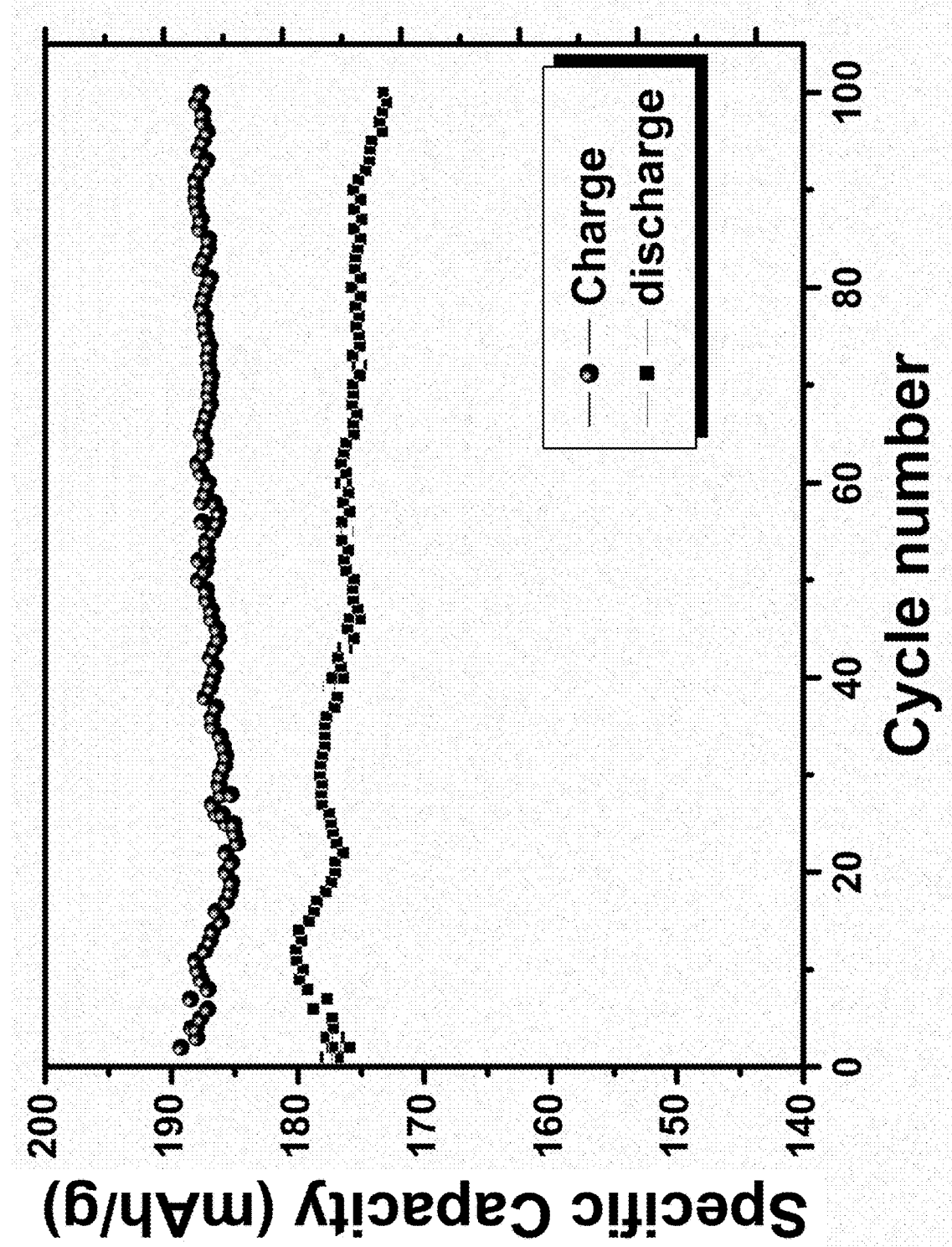
FIG. 11 a plot of the specific capacity versus charge/discharge cycle number at room temperature (about 25° C.) for a lithium-ion battery prepared with an example 1% HRGO/PS nanocomposite, according to an illustrative embodiment.

FIG. 11 shows the specific capacity of the coin cell battery for the first 25 cycles at a current density of 100 mA/g at about 25° C. At a current density of 100 mA/g, the coin cell battery retained a specific charge capacity of 181 mAh/g and a specific discharge capacity of 173 mAh/g for 100 cycles. As shown in Table 2, the specific capacity of the coin cell battery was significantly increased compared to those of batteries with other commonly used cathode materials such as $LiCoO_2$ (155 mAh/g) and $LiFePO_4$ (170 mAh/g). As shown in Table 2, the coin cell battery containing a cathode material that includes the HRGO/PS nanocomposite also functioned in a similar potential window, displayed a superior cycle life, a broader temperature range, a superior thermal stability, a decreased toxicity, and a decreased cost compared to those of the other common cathode materials.

TABLE 2

Comparison of properties of batteries containing different cathode materials.

| Characteristics | $LiCoO_2$ | $LiNiO_2$ | $LiMn_2O_4$ | $LiFePO_4$ | HRGO/PS* |
|---|---|---|---|---|---|
| Potential (V vs. Li/Li+) | 3.9 | 3.6 | 4.0 | 3.5 | 3.5 |
| Specific Capacity (mAh/g) | 155 | 200 | 120 | 170 | 181 |
| Cycle life | Acceptable | Acceptable | Acceptable | Best | Best |
| Temperature range | −20-55° C. | −20-55° C. | <50° C. | −20-70° C. | −25-100° C. |
| Thermal stability | Moderate | Decreased | Increased | Increased | Most Increased |
| Toxicity | Increased | Increased | Acceptable | Decreased | Decreased |
| Cost | Increased | Increased | Acceptable | Decreased | Decreased |

*cathode material from this disclosure.

Figure 12:
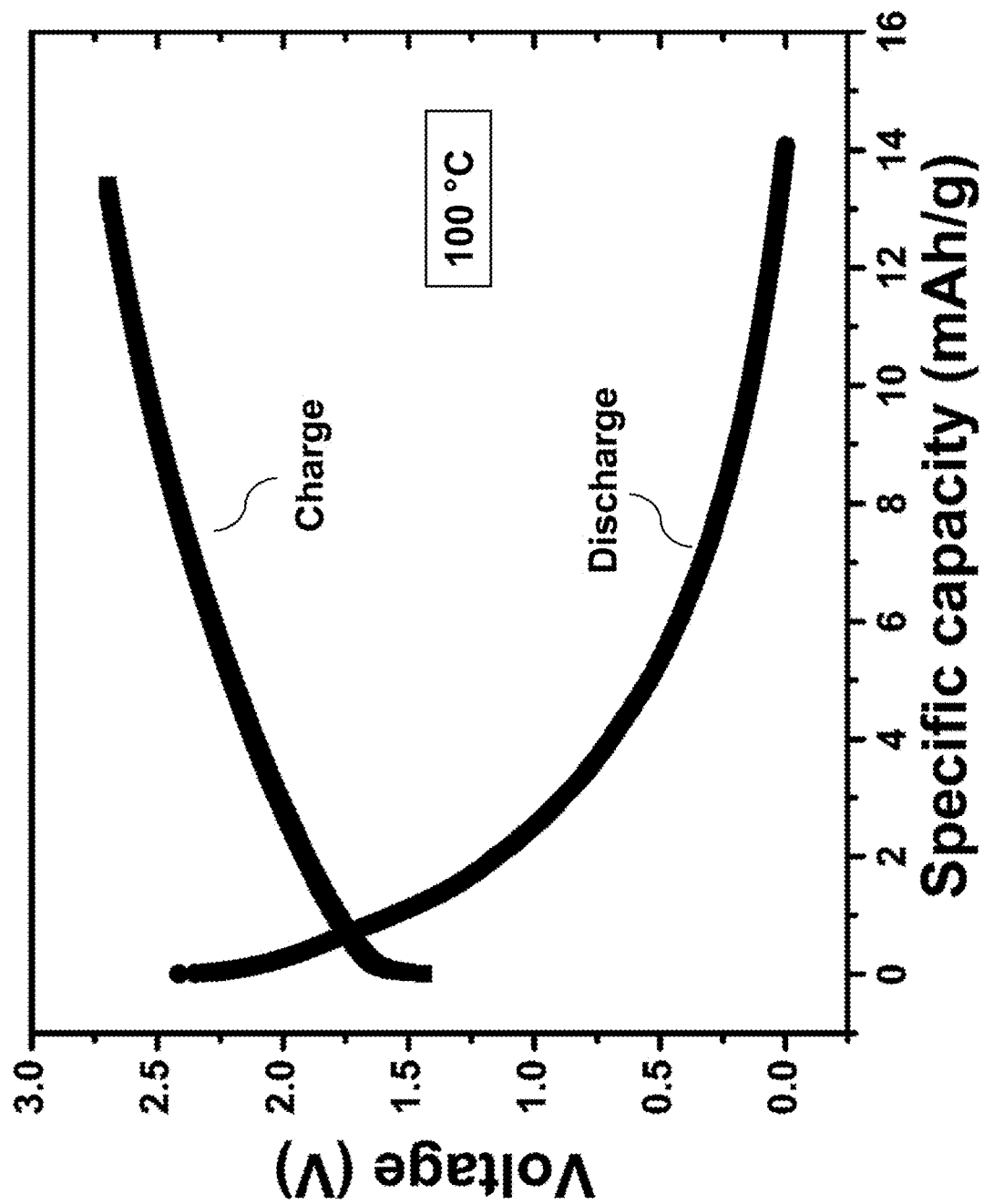
FIG. 12 is a plot of voltage versus specific capacity at about 100° C. for a lithium-ion battery prepared with an example 1% HRGO/PS nanocomposite, according to an illustrative embodiment.

FIG. 12 shows initial galvanostatic charge/discharge curves for the coin cell battery at a current density of 100 mA/g at 100° C. The battery displayed acceptable specific charge and discharge capacities of 13.5 mAh/g and 14.1 mAh/g, respectively. The battery had an increased capacity and an enhanced thermal stability compared to those of existing batteries. To the best of our knowledge, this was the first demonstration of a nanocomposite as a cathode material for a high-temperature lithium-ion battery.

Figure 13:
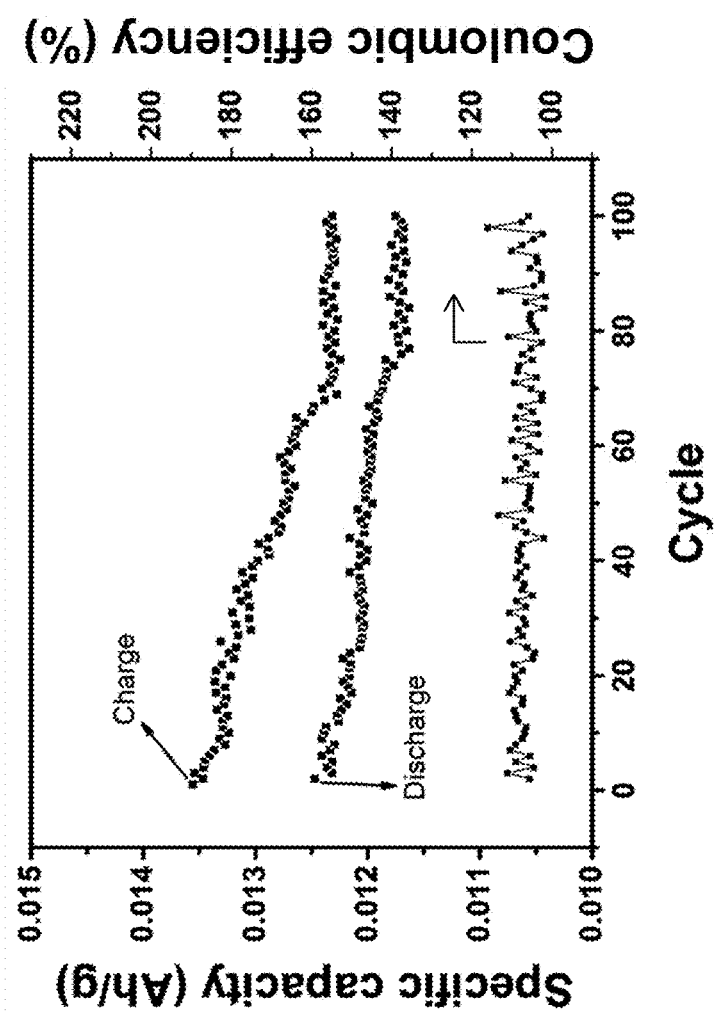
FIG. 13 a plot of the specific capacity versus charge/discharge cycle number at about 100° C. for a lithium-ion battery prepared with an example 1% HRGO/PS nanocomposite, according to an illustrative embodiment.

FIG. 13 shows the specific capacity of the coin cell battery for the first 100 charge/discharge cycles at 100 mA/g and 100° C. After 100 cycles, the battery had specific charge and discharge capacities of 12.5 mAh/g and 11.8 mAh/g, respectively. Accordingly, the battery retained at least 90% of its specific capacity (for example, specific charge capacity, specific discharge capacity, or both) after 100 charge/discharge cycles at 100° C.

FIG. 13 also shows the coulombic efficiency of the coin cell battery at each cycle. Coulombic efficiency (CE) was calculated as:

CE (%)=(Specific discharge capacity/Specific charge capacity)×100  Equation 1

The coin cell battery displayed a coulombic efficiency of 100% or greater for 100 cycles at 100° C. A coulombic efficiency of greater than 100% may be caused by so-called "overhang" of the anode.

Elements of different implementations described in the present disclosure may be combined to form other implementations not specifically set forth previously. Elements may be left out of the processes described in the present disclosure without adversely affecting their operation. In addition, the logic flows depicted in the figures do not necessarily require the particular order shown, or sequential order, to achieve desirable results. Various separate elements may be combined into one or more individual elements to perform the functions described in the present disclosure.

Throughout the description, where nanocomposites, materials, and systems are described as having, including, or comprising specific components, or where processes and methods are described as having, including, or comprising specific steps, it is contemplated that, additionally, there are apparatus, and systems of the present disclosure that consist essentially of, or consist of, the recited components, and that there are processes and methods according to the present disclosure that consist essentially of, or consist of, the recited processing steps.

It should be understood that the order of steps or order for performing certain action is immaterial so long as the approach described in the present disclosure remains operable. Moreover, two or more steps or actions may be conducted simultaneously.

While the approach described in the present disclosure has been particularly shown and described with reference to specific preferred embodiments, it should be understood by those skilled in the art that various changes in form and detail may be made therein without departing from the spirit and scope of the disclosure as defined by the appended claims.

What is claimed is:

1. A cathode comprising a nanocomposite comprising (a) a nonconducting polymer and (b) a carbon filler, the carbon filler comprising a plurality of ultrathin sheets of a porous carbon material, wherein each sheet of the plurality of ultrathin sheets has a thickness from about 1 to about 5 single atoms,
   wherein the nanocomposite comprises the carbon filler at a weight percent in a range from 0.1% to 2%, and the weight percent is based on a total weight of the nonconducting polymer and the carbon filler;
   at least a portion of each sheet of the plurality of ultrathin sheets of the porous carbon material comprises a plurality of pores with an average diameter in a range of 2 nm to 5 nm; and
   at least a portion of the plurality of ultrathin sheets of the porous carbon material has an average sheet thickness in a range from 1 nm to 4 nm.

2. The cathode of claim 1, wherein the porous carbon material comprises porous reduced graphene oxide.

3. The cathode of claim 1, wherein the porous carbon material has a BET surface area of about 200 m$^2$/g or greater.

4. The cathode of claim 1, wherein the nonconducting polymer is or comprises a member selected from the group consisting of polystyrene, poly(methylmethacrylate) (PMMA), and a copolymer of polystyrene and poly(methylmethacrylate).

5. The cathode of claim 4, wherein the nonconducting polymer is polystyrene.

6. The cathode of claim 1, wherein the nanocomposite has a conductivity of about 10$^{-4}$ S/cm or greater.

7. The cathode of claim 1, wherein the porous carbon material is prepared using microwave irradiation.

8. The cathode of claim 1, wherein the nanocomposite has a glass transition temperature of about 90° C. or greater.

9. The cathode of claim 1, wherein the nanocomposite further comprises (i) a binding agent, (ii) a conductive additive, or both of (i) and (ii).

10. The cathode of claim 9, wherein a summed weight percent of the binding agent and the conductive additive in the nanocomposite is in a range from 5% to 20%.

11. The cathode of claim 9, wherein the nanocomposite is a film with a thickness in a range from 50 μm to 200 μm.

12. The cathode of claim 9, further comprising sulfur.

13. The cathode of claim 12, wherein a weight percent of the sulfur is in a range from 40% to 80%.

* * * * *